(12) United States Patent
Pinto, IV et al.

(10) Patent No.: US 9,347,609 B2
(45) Date of Patent: May 24, 2016

(54) ACTIVATION OF SAFETY MECHANISMS USING SMART MATERIALS

(71) Applicant: GM GLOBAL TECHNOLOGY OPERATIONS LLC, Detroit, MI (US)

(72) Inventors: Nicholas W. Pinto, IV, Shelby Townhship, MI (US); Alan L. Browne, Grosse Pointe, MI (US); Nancy L. Johnson, Northville, MI (US); Andrew L. Bartos, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 620 days.

(21) Appl. No.: 13/775,790

(22) Filed: Feb. 25, 2013

(65) Prior Publication Data
US 2013/0221763 A1   Aug. 29, 2013

Related U.S. Application Data

(60) Provisional application No. 61/603,401, filed on Feb. 27, 2012.

(51) Int. Cl.
| | |
|---|---|
| *F16P 3/00* | (2006.01) |
| *E05B 65/00* | (2006.01) |
| *E05B 47/00* | (2006.01) |

(52) U.S. Cl.
CPC .............. *F16P 3/00* (2013.01); *E05B 47/0009* (2013.01); *E05B 65/00* (2013.01); *F16C 2202/28* (2013.01)

(58) Field of Classification Search
CPC ........ F16P 3/00; E05B 65/00; E05B 47/0009; F16C 2202/28
USPC .......................................................... 307/326
See application file for complete search history.

(56) References Cited

U.S. PATENT DOCUMENTS

| | | | | |
|---|---|---|---|---|
| 4,996,617 A * | 2/1991 | Yaeger | ................... | G11B 21/22 360/256.3 |
| 7,364,211 B2 * | 4/2008 | Niskanen | ............ | E05B 47/0009 292/201 |
| 8,398,128 B2 * | 3/2013 | Arabia | ..................... | E05B 77/06 292/1 |
| 2002/0000225 A1 * | 1/2002 | Schuler | ................. | A61M 15/00 128/200.14 |
| 2003/0177974 A1 * | 9/2003 | Dominique | ........... | E05B 85/107 116/200 |
| 2008/0271559 A1 * | 11/2008 | Garscha | .................. | F03G 7/065 74/469 |
| 2010/0237632 A1 * | 9/2010 | Browne | .............. | E05B 47/0009 292/201 |
| 2011/0056987 A1 * | 3/2011 | Proper | ................... | B65D 55/04 222/153.13 |
| 2012/0126551 A1 * | 5/2012 | Alexander | .......... | E05B 47/0009 292/226 |

* cited by examiner

*Primary Examiner* — Scott Bauer
(74) *Attorney, Agent, or Firm* — Parks IP Law LLC; Mickki D. Murray, Esq.

(57) ABSTRACT

In various embodiments, the present disclosure relates to systems, for selectively actuating a safety mechanism, using a transformable material, to protect against an unwanted condition. The system in one implementation includes first and second pulley devices configured to accommodate multiple strands of the transformable material. In another implementation, the system includes two connection points for holding the transformable material and an overload-protection subsystem for protecting the transformable material from overload. In still another implementation, the system includes a first biasing element and a manual-release sub-system including a second biasing element.

23 Claims, 28 Drawing Sheets

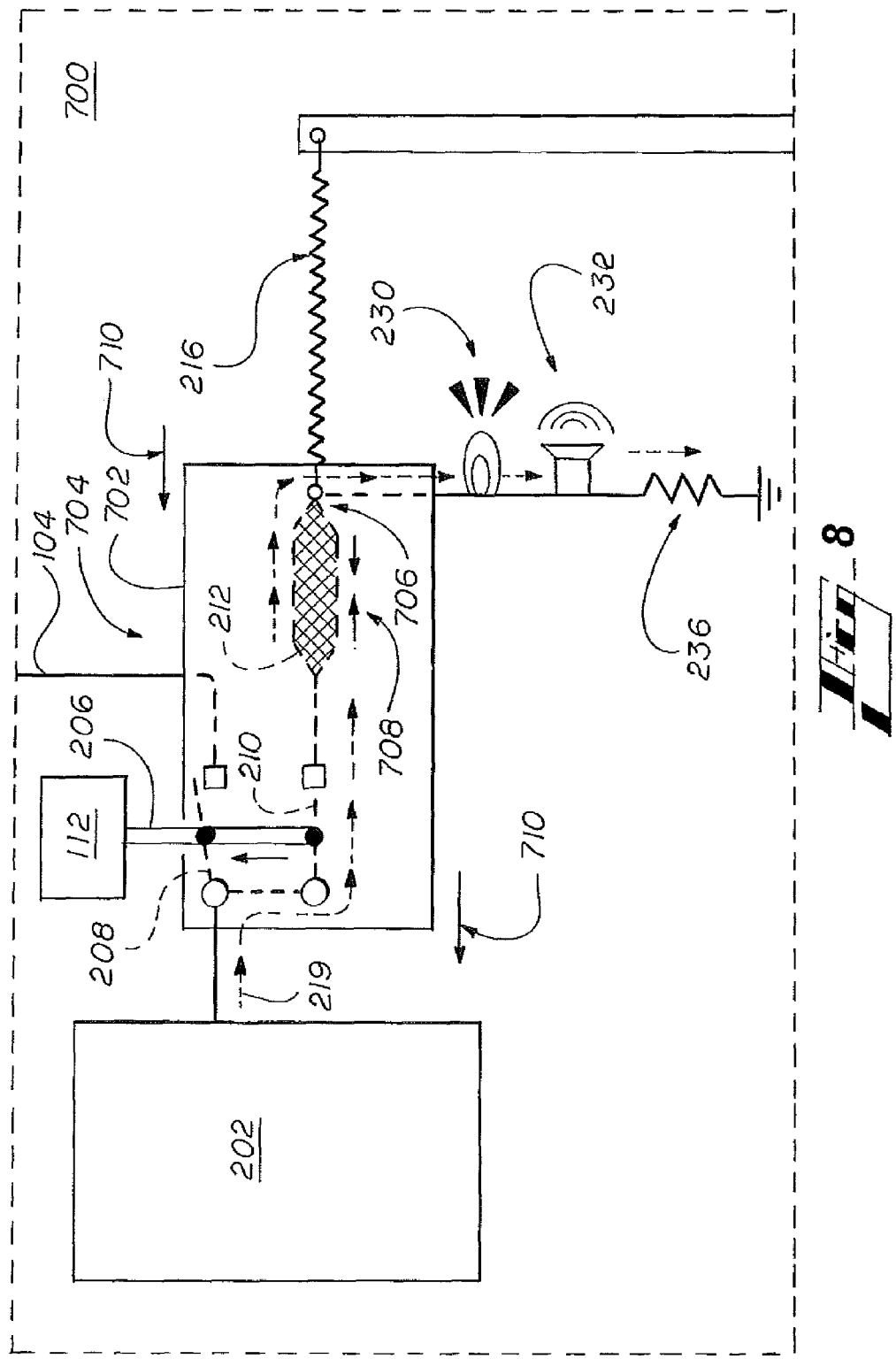

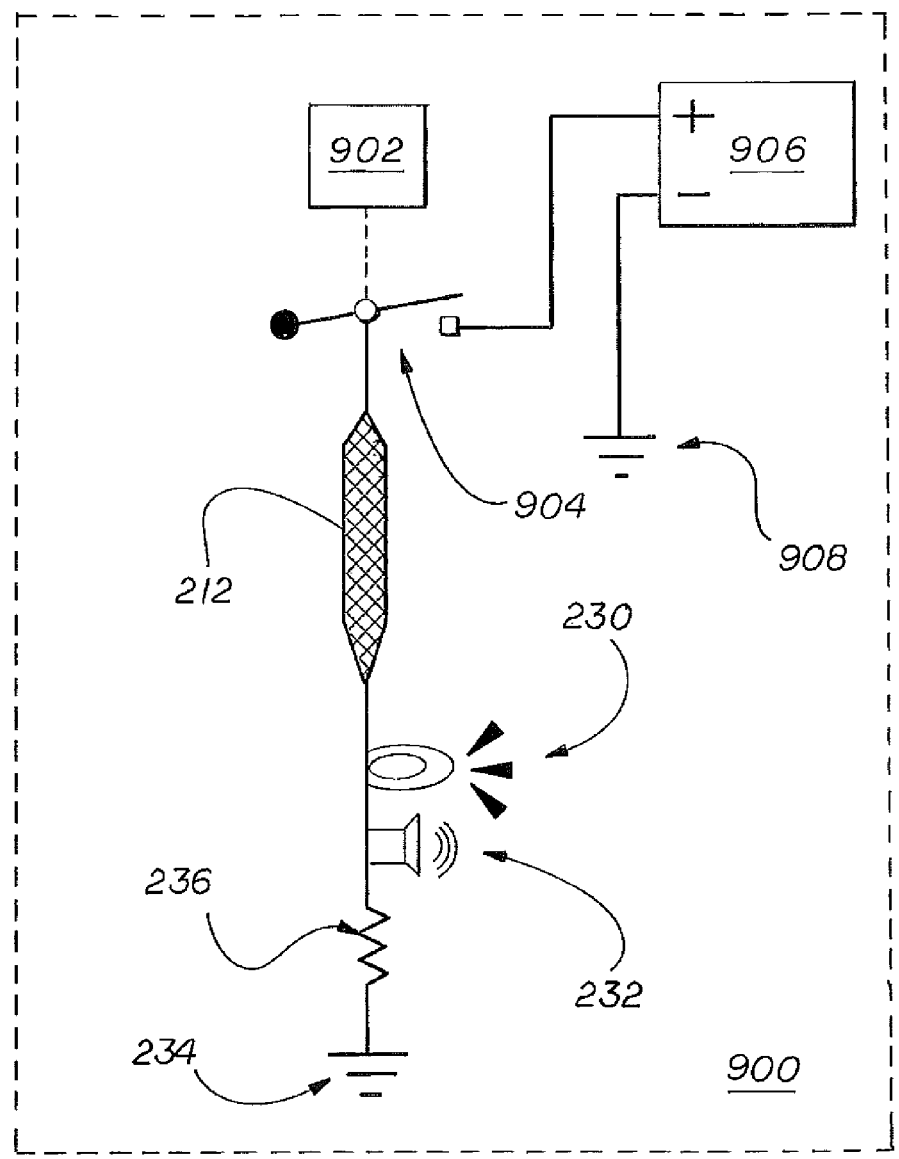

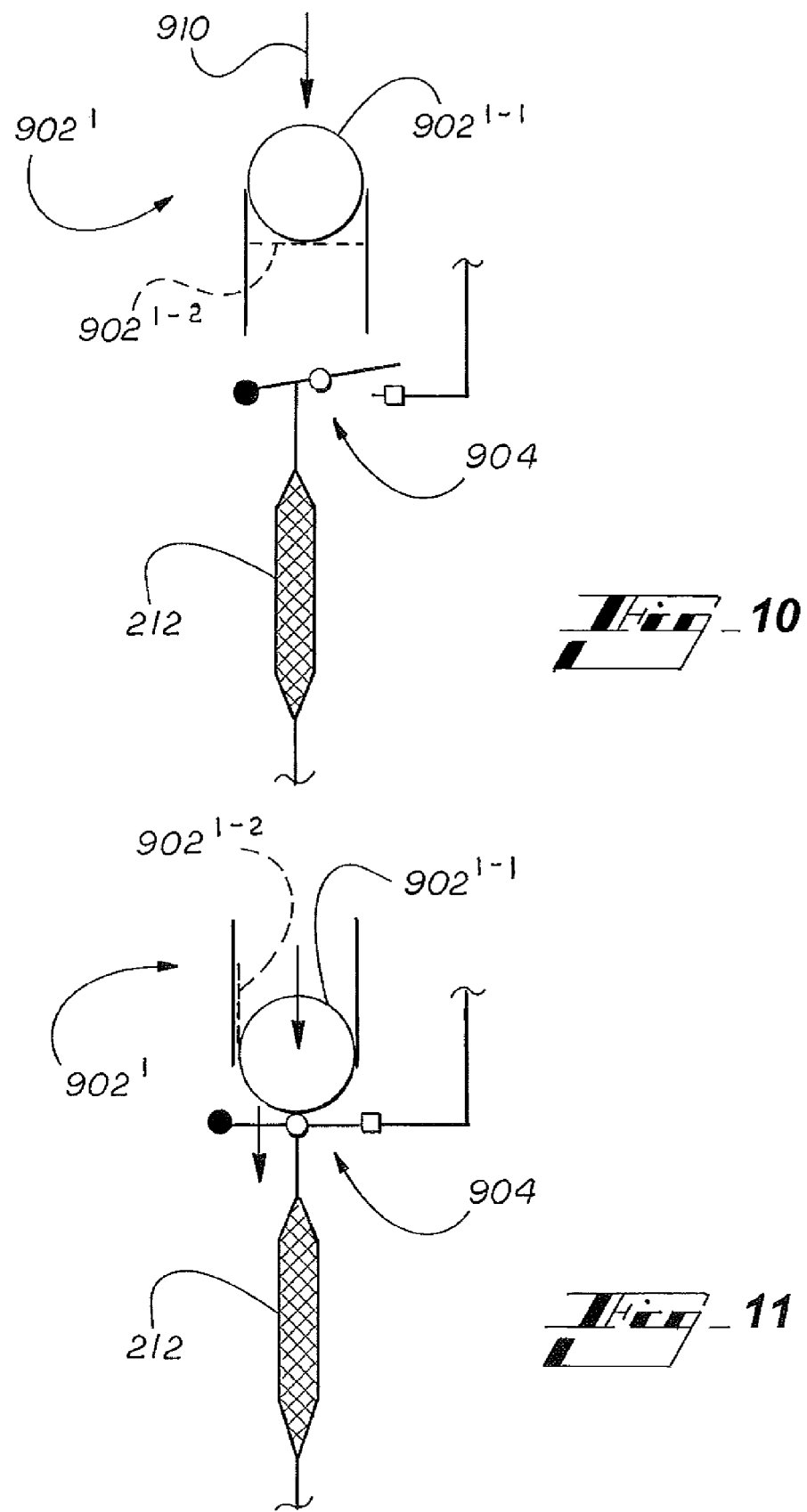

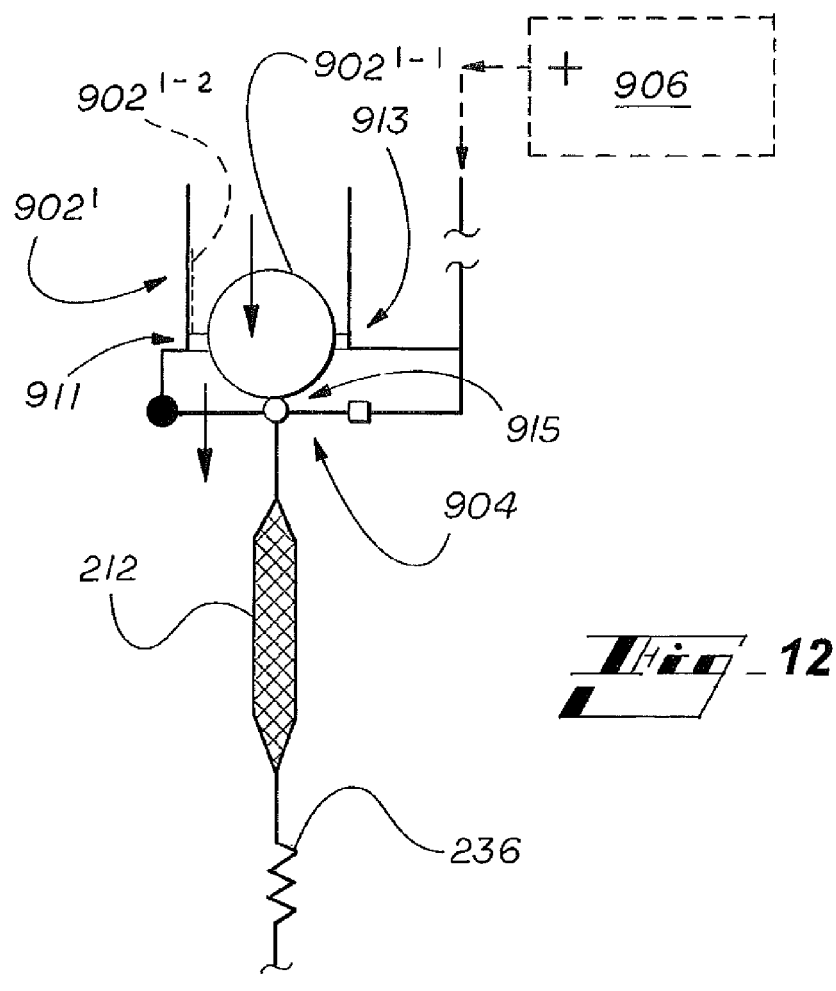
_Fig_-12
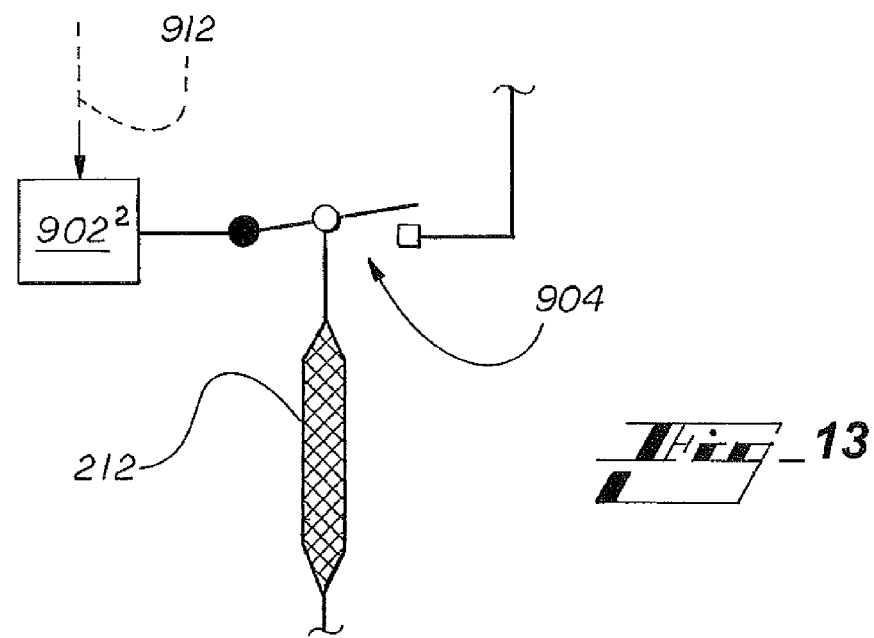
_Fig_-13

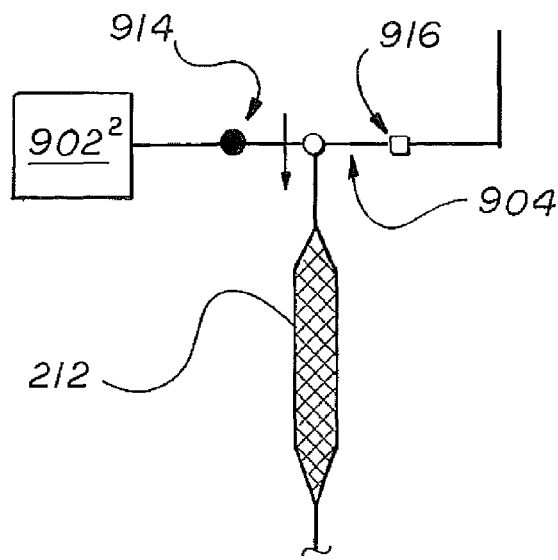
_Fig_-14
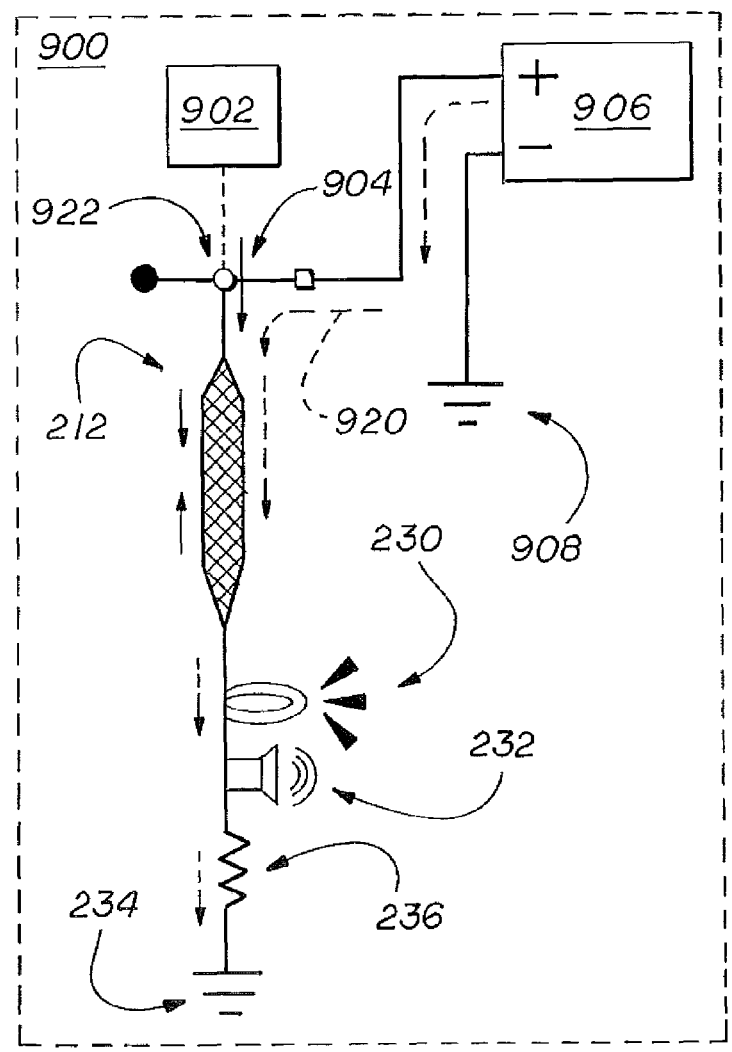
_Fig_-15

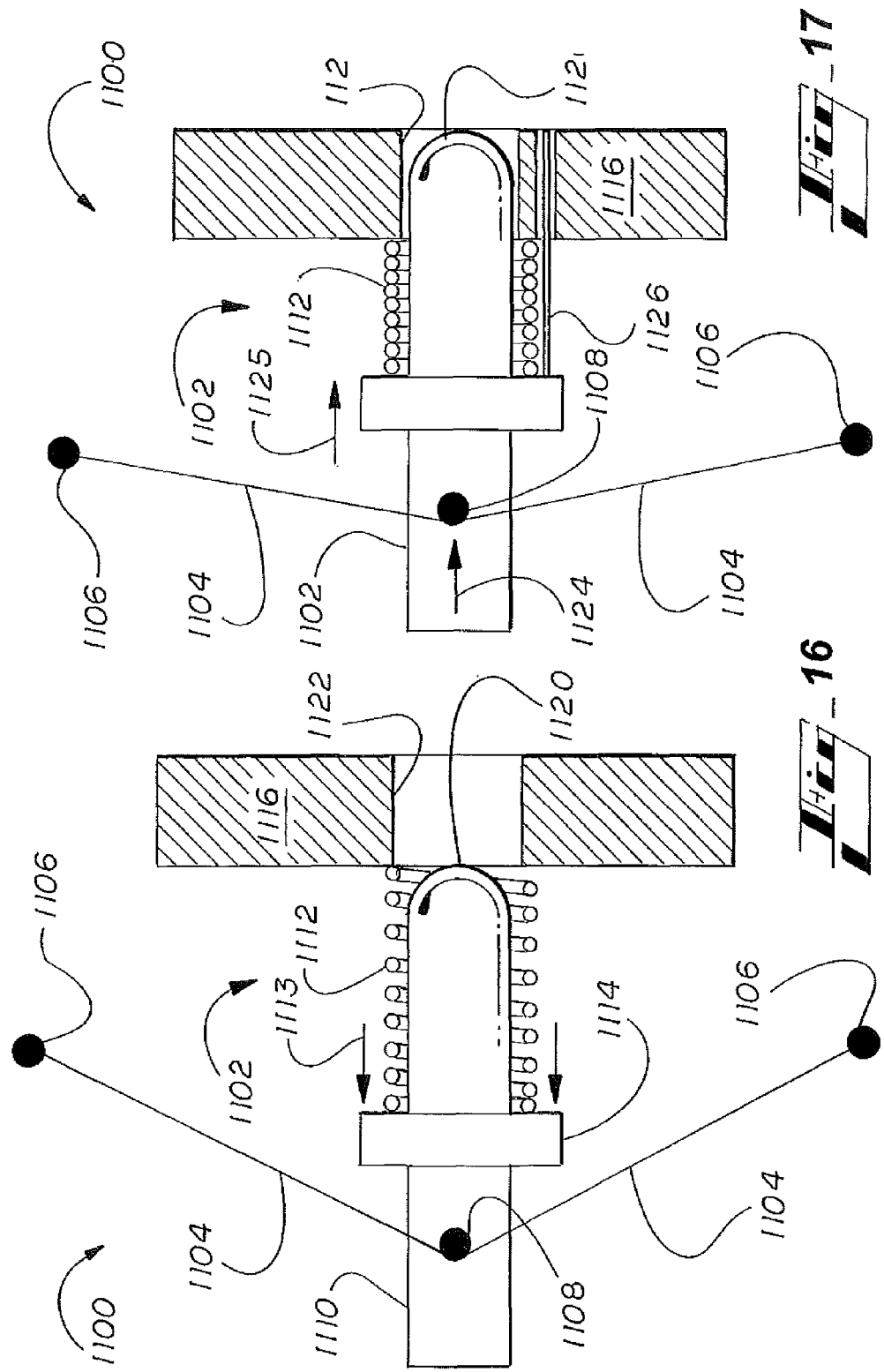

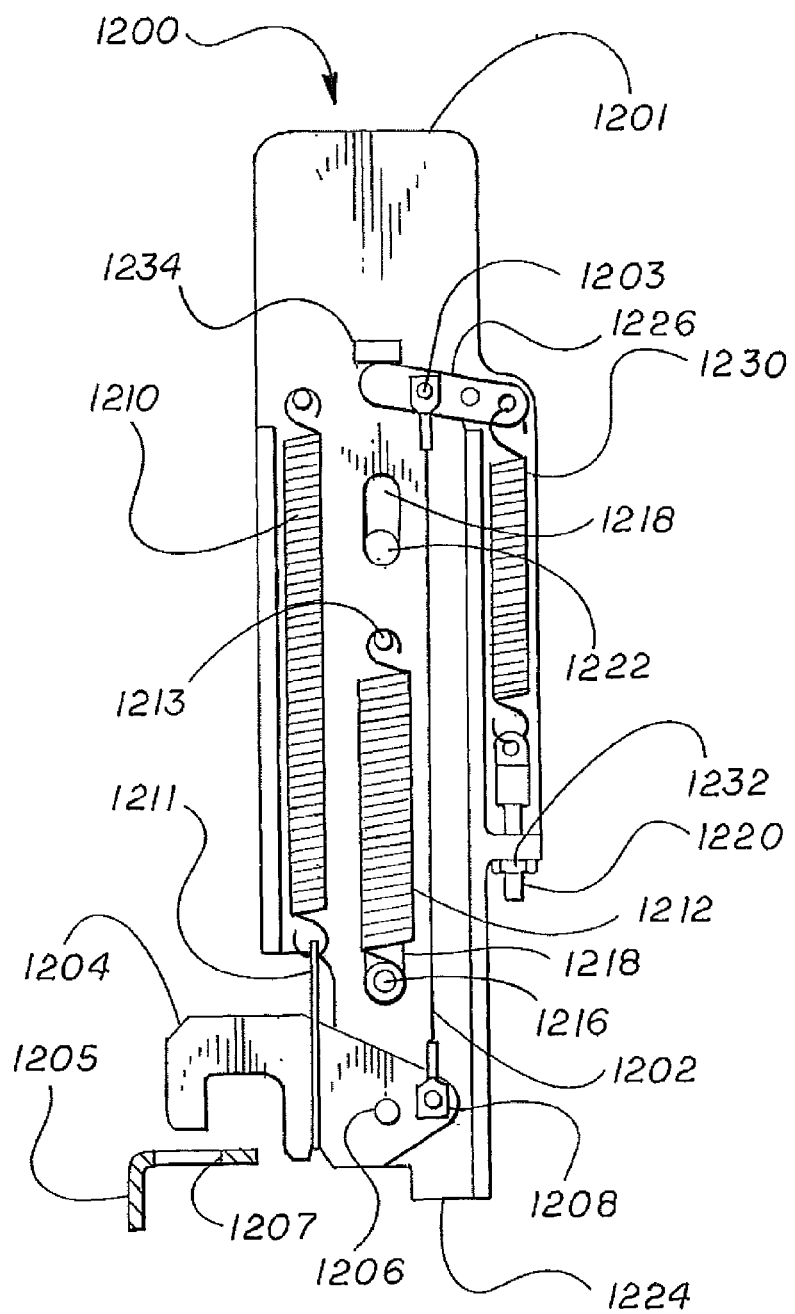

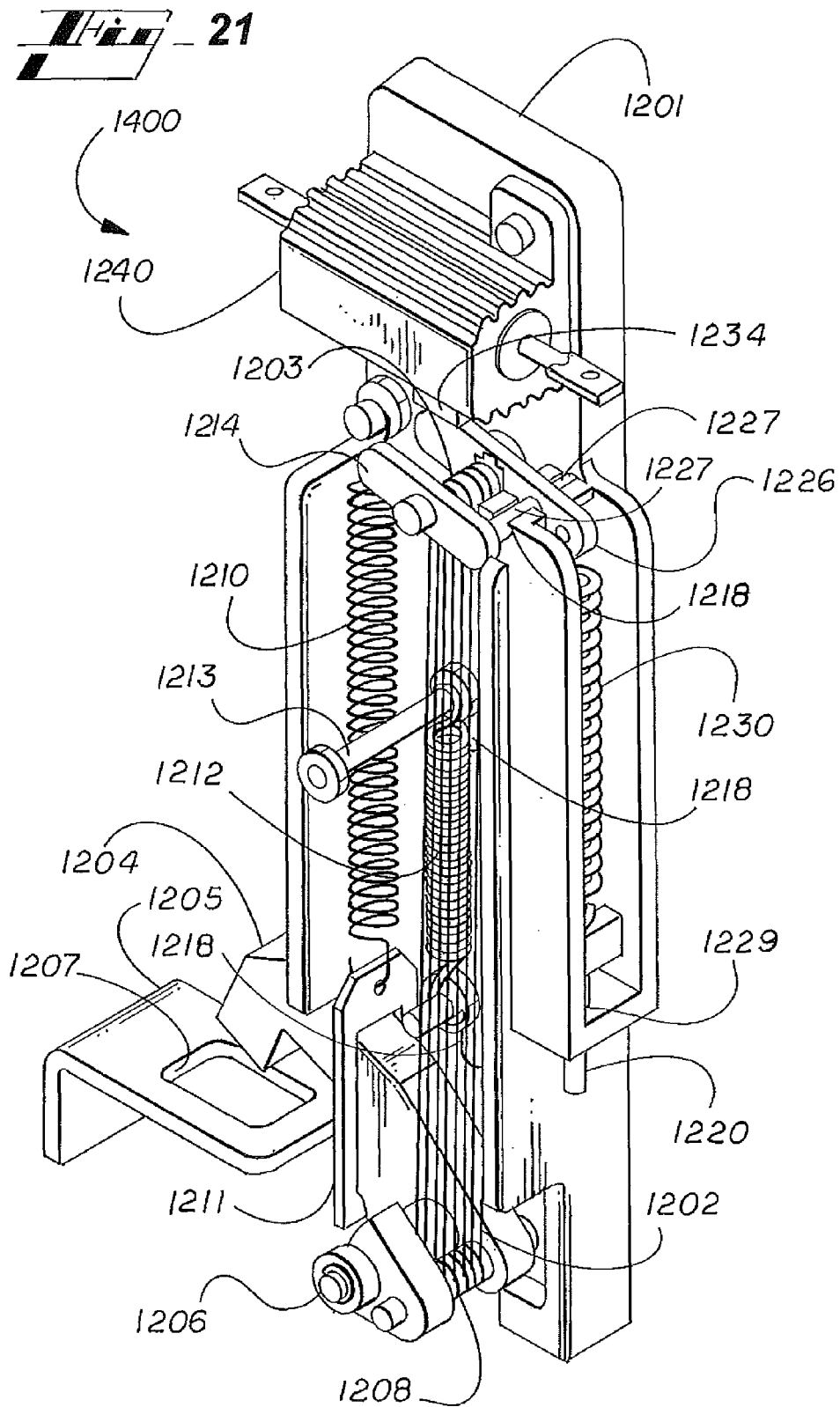

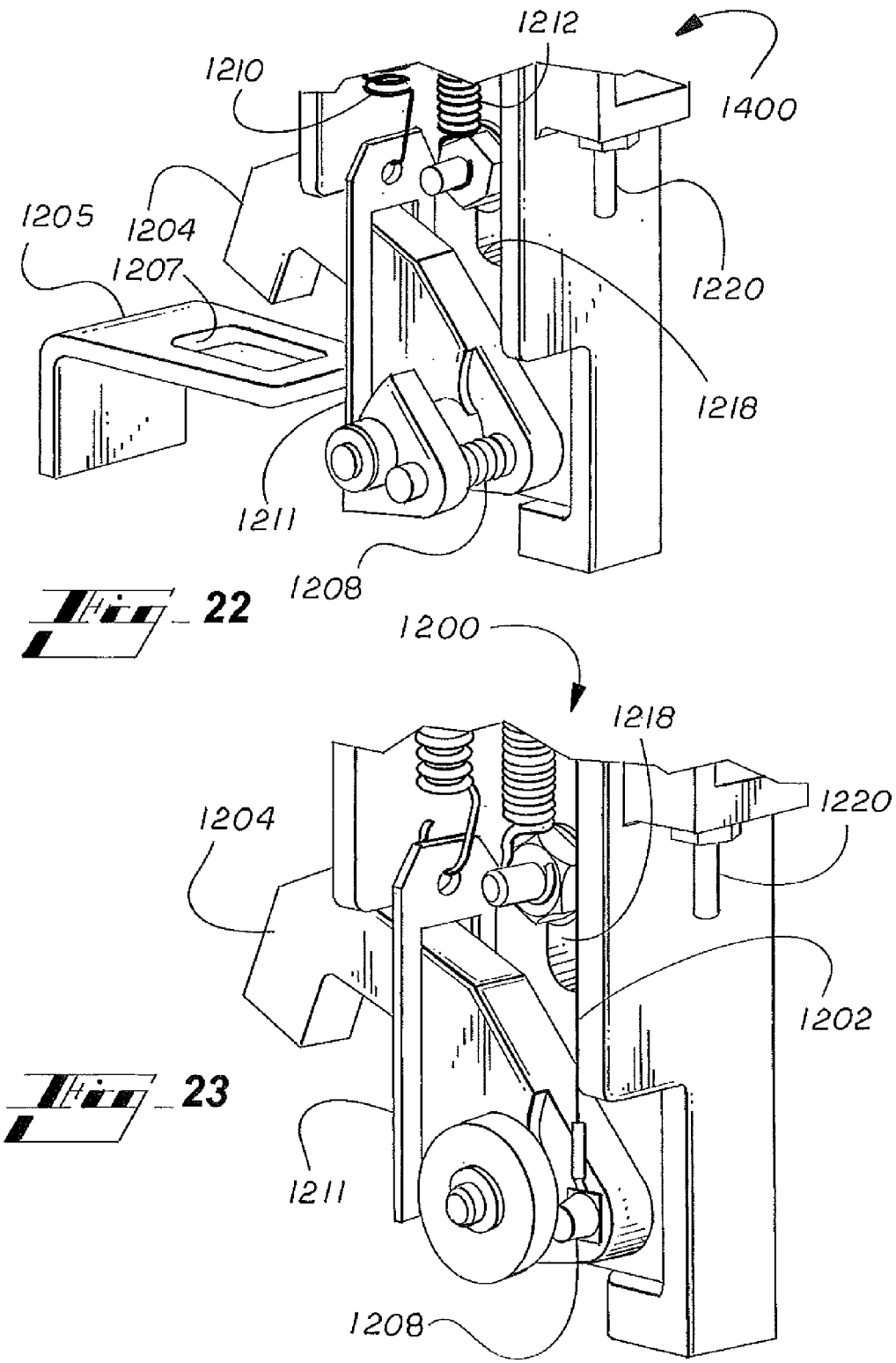

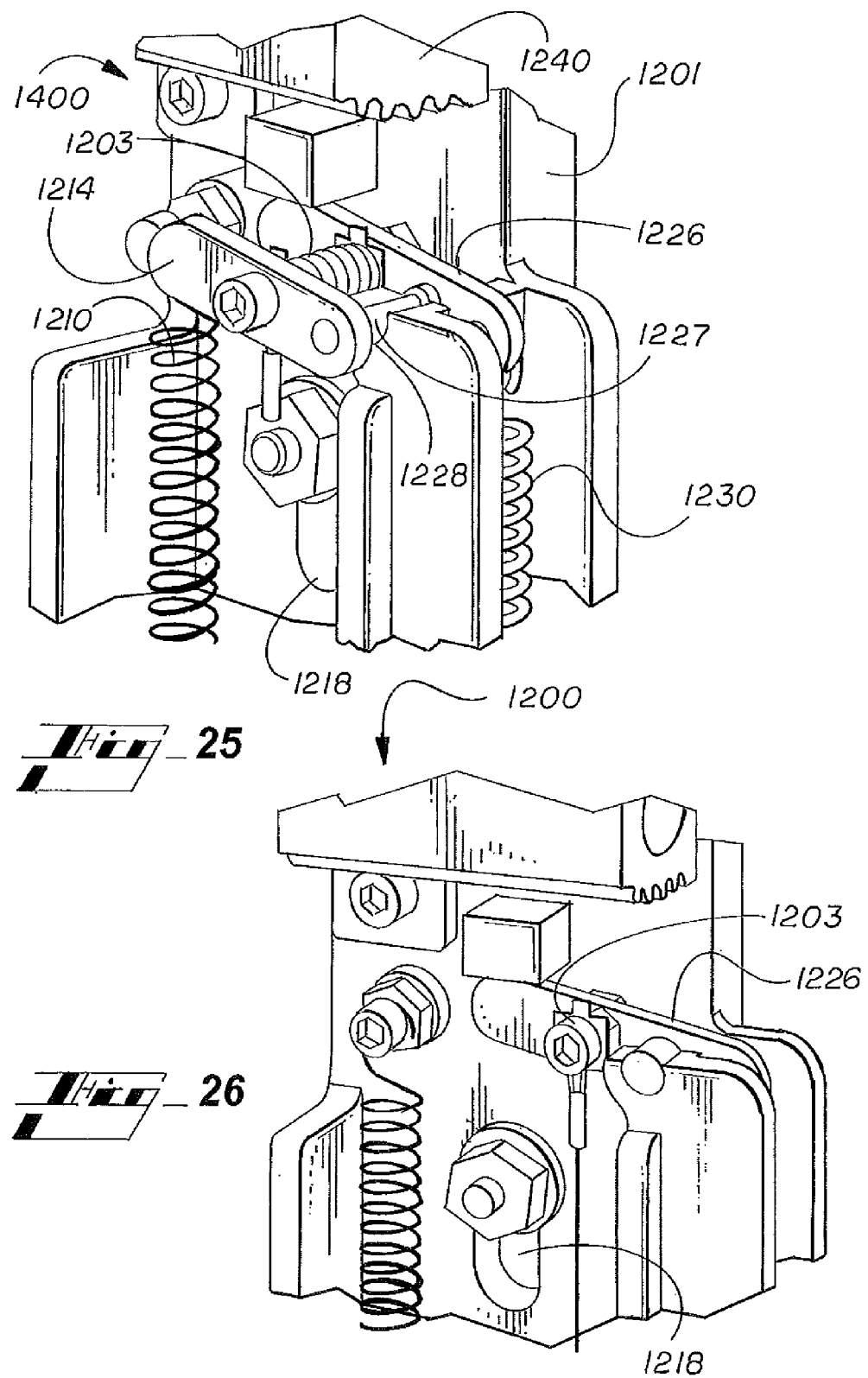

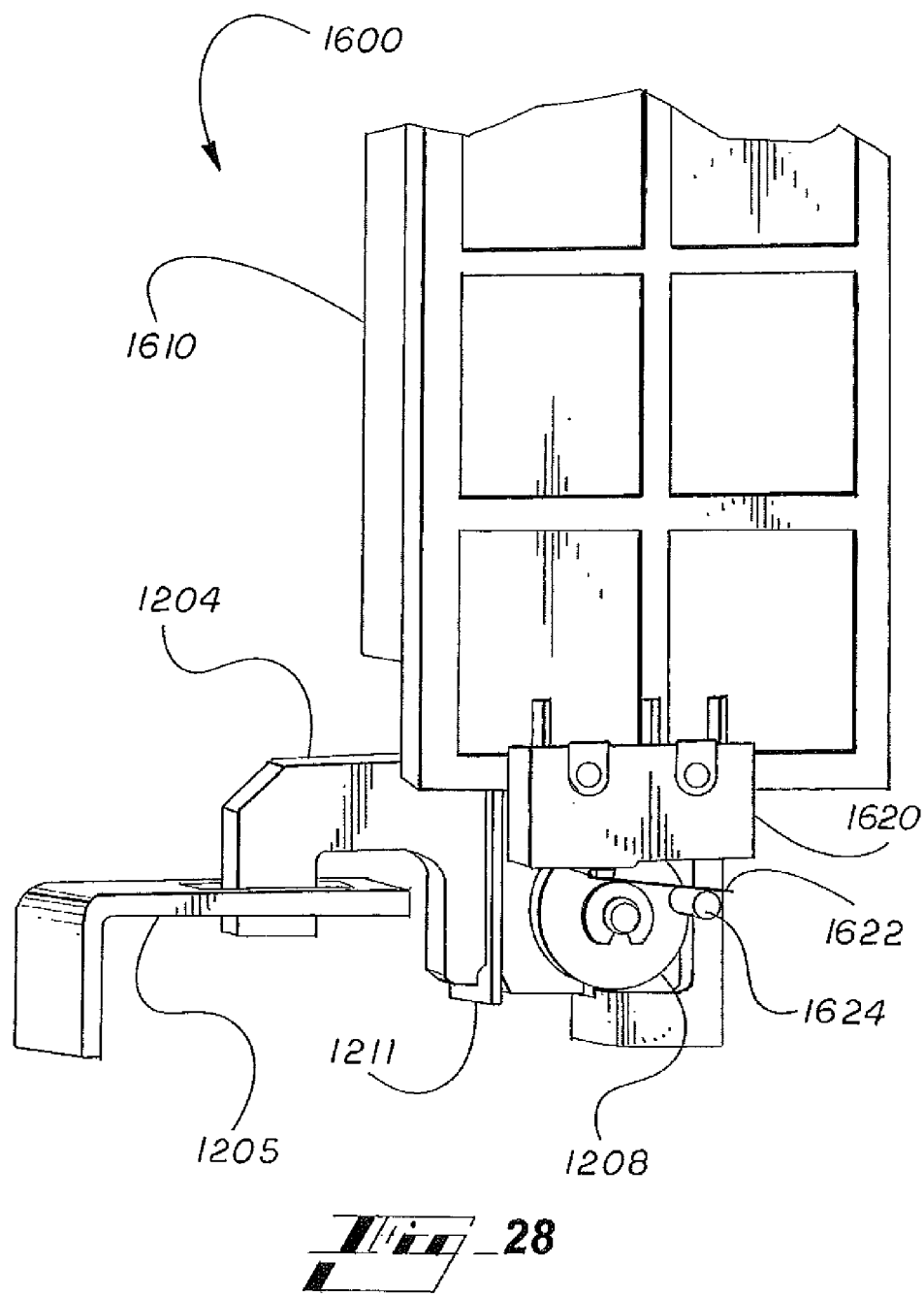

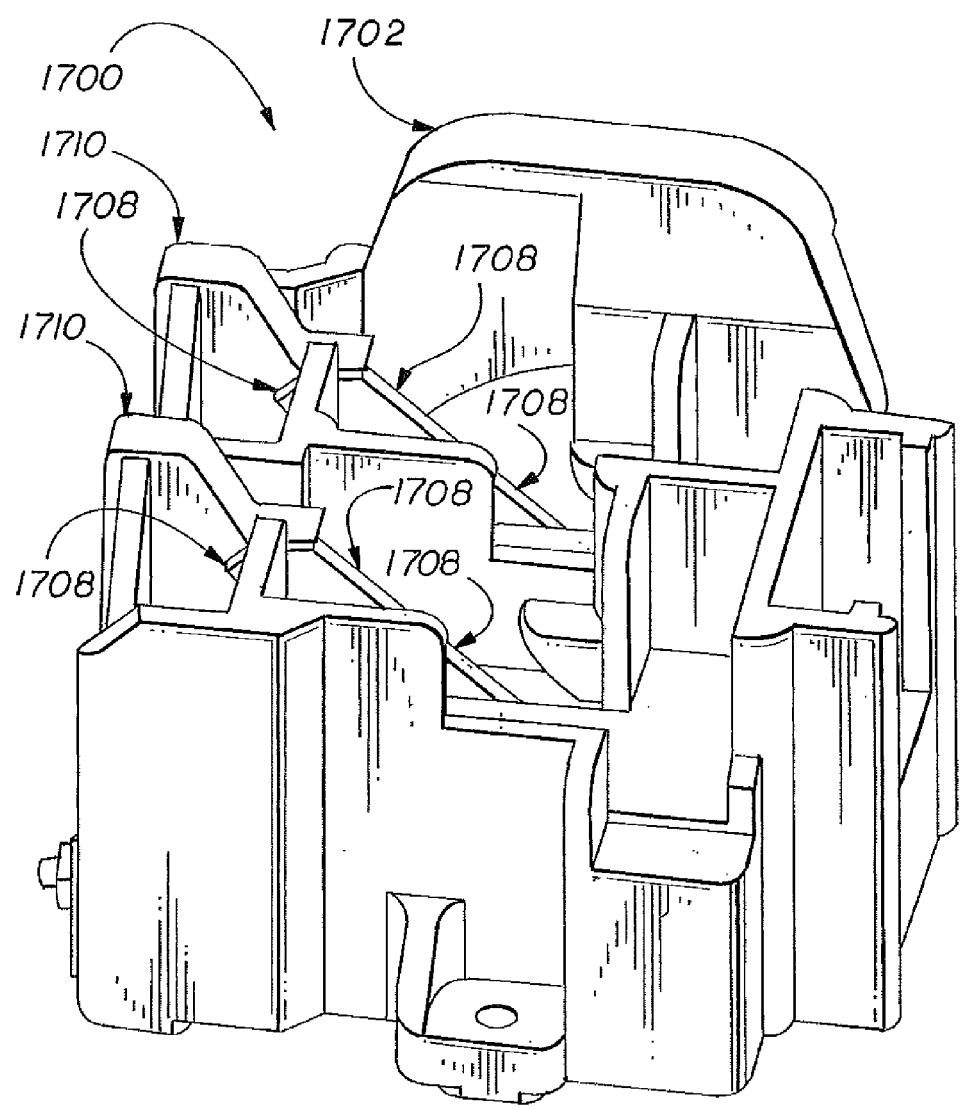

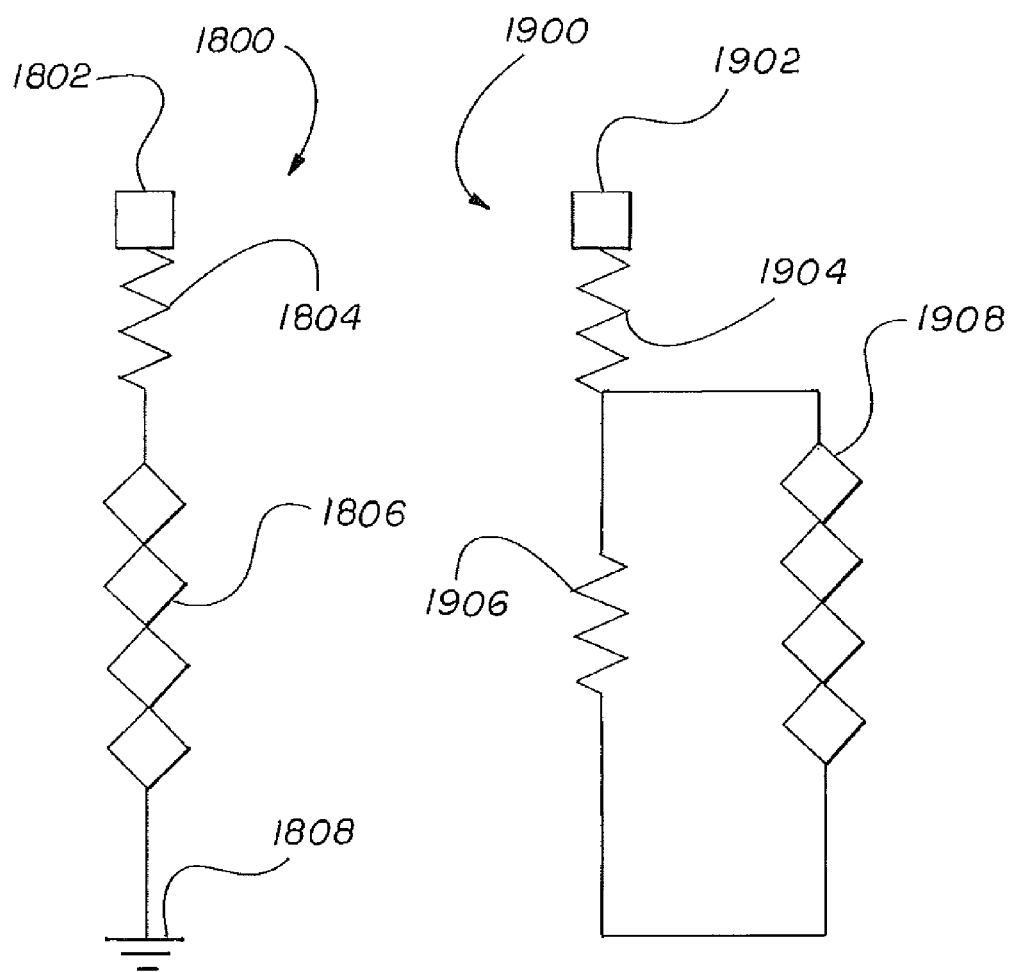

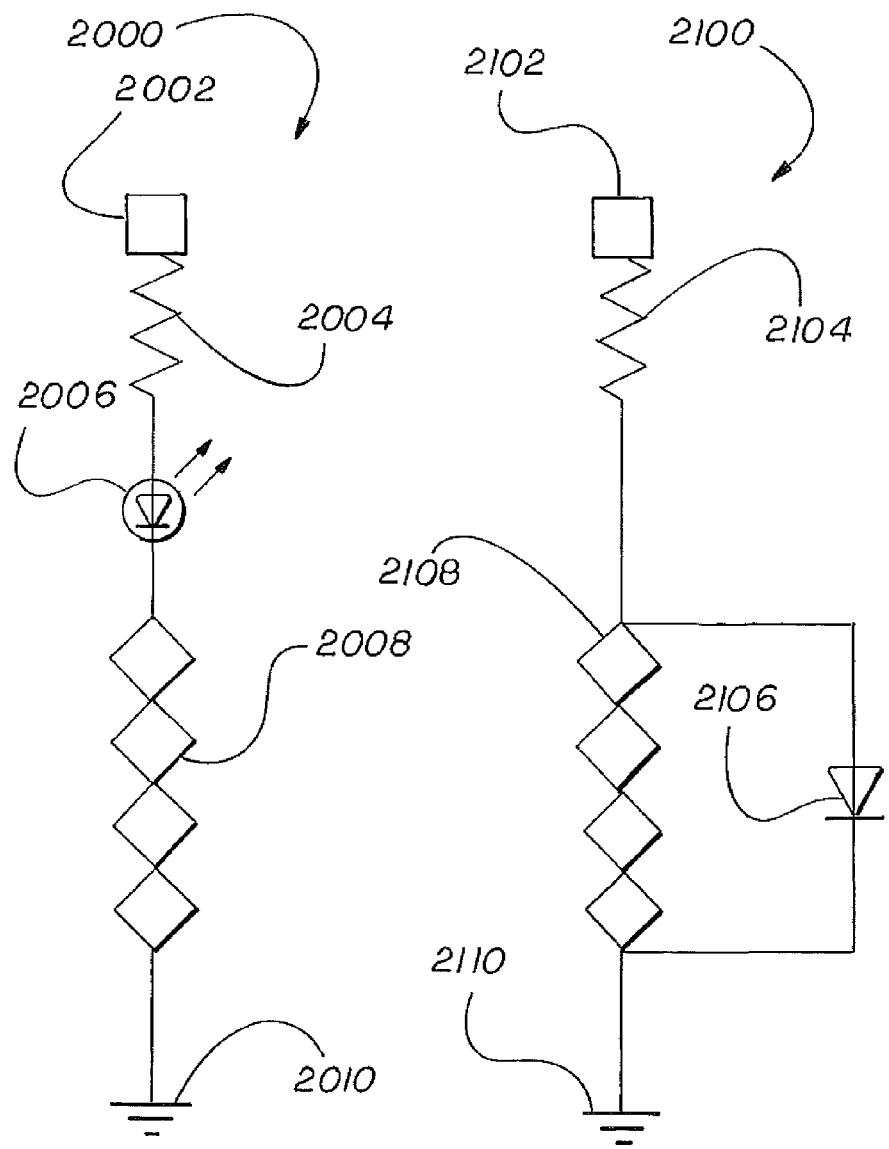

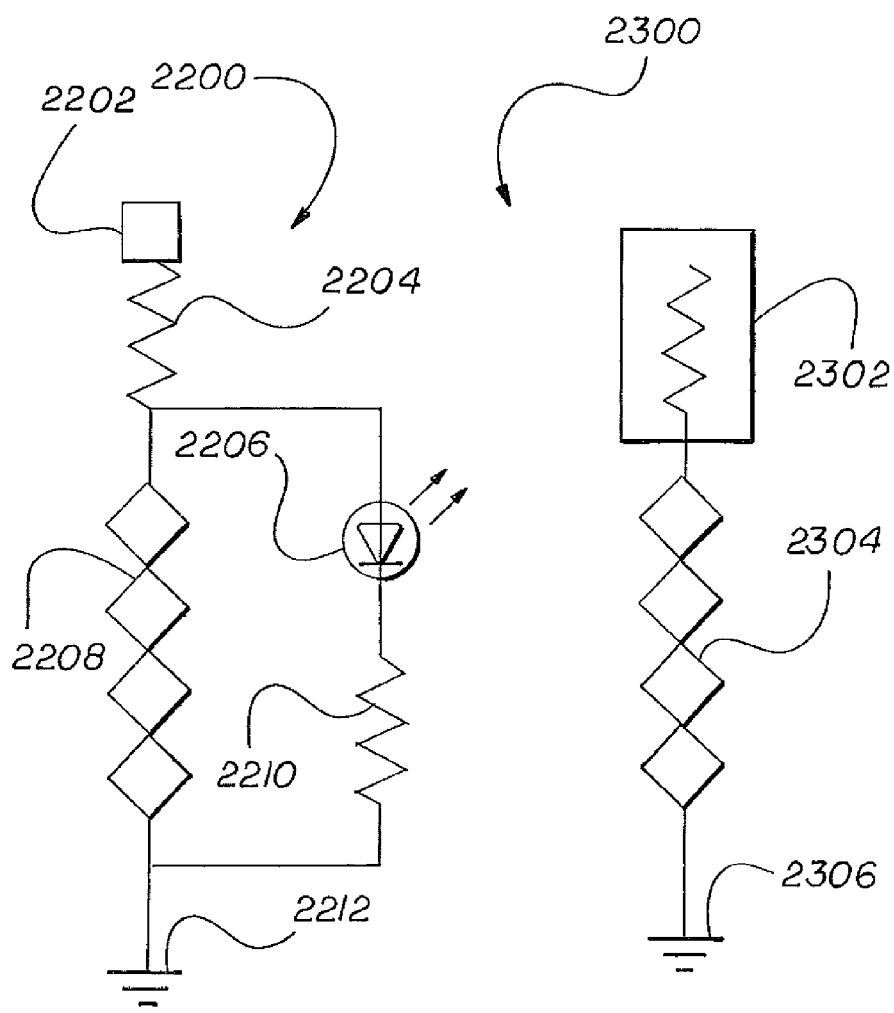

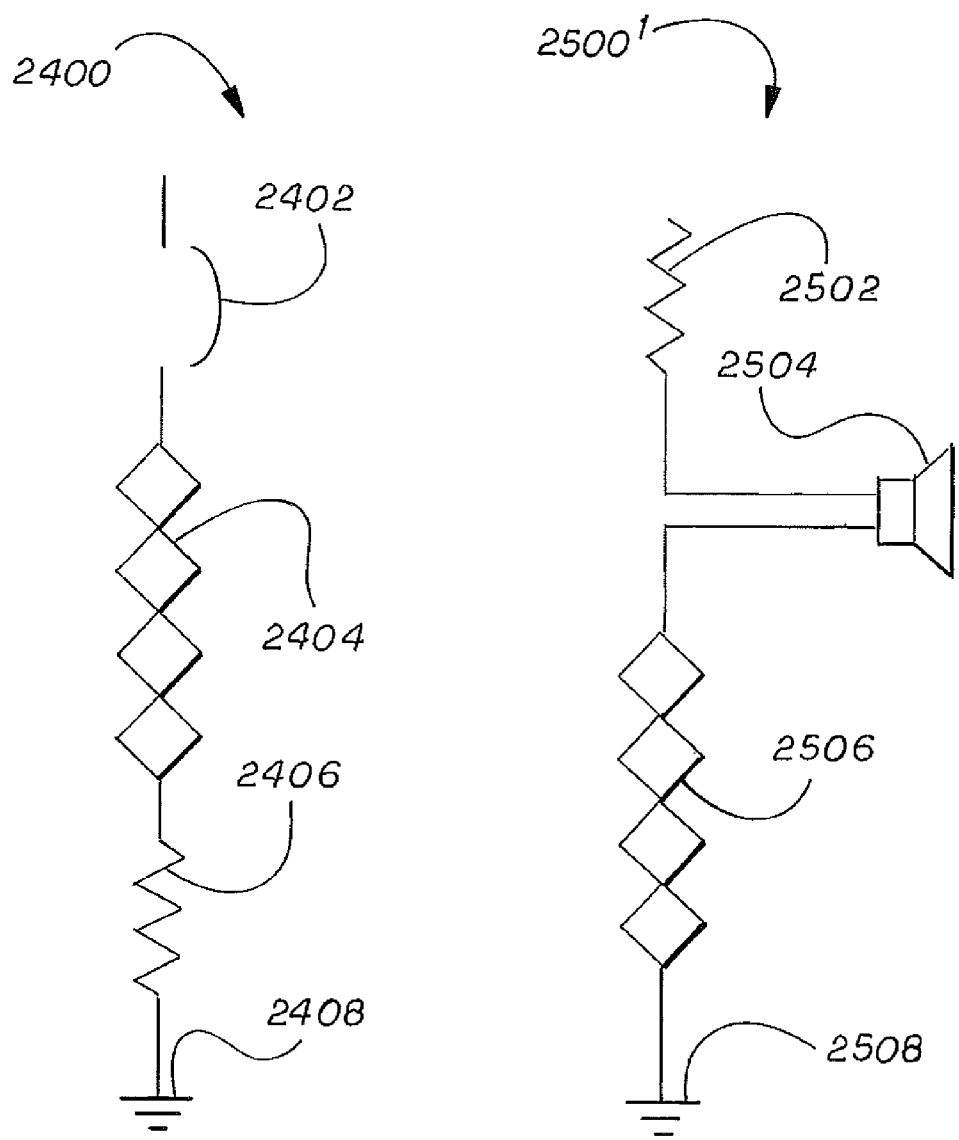
_Fig. 36_
_Fig. 37_

ACTIVATION OF SAFETY MECHANISMS USING SMART MATERIALS

TECHNICAL FIELD

The present disclosure relates generally to activating safety mechanisms using a smart material and, more particularly, to systems and methods for actuating safety locks, shields, and alarms, and in some instances removing unwanted electric charge, using the smart material.

BACKGROUND

Various safety features have been used to protect people from electrical shock from electrical devices such as breaker boxes, other types of control boxes, and protective-battery systems. Safety features also exist to protect people from other hazardous conditions such as high heat, cold, or radiation levels.

A common safety feature for breaker boxes or control boxes is a mechanical locking mechanism that engages automatically whenever a main power switch is turned on.

Turning to the figures, and more particularly the first figures, FIG. 1 shows an example of a breaker box or control box 100, referred to generally herein as a power box. The power box 100 is used in an environment 102, such as an assembly plant or factory. The power box 100 has an input 103 for receiving a connection to a main power source 104, such as a power input cable.

The power box 100 shown in FIG. 1 includes a cover panel or door 106 or other access component or feature. Some power boxes 100 (not shown in FIG. 1) are open, lacking such a door. The box 100 can also include a conventional lock 108 releasable by a release switch 110. And the box 100 can have a power breaker or switch 112 controlling input of power to the box from the power source 104. In some cases, the lock and switch are connected indirectly so that throwing the switch 112 to turn the power on also results in the lock 108 locking.

Systems having such a switch 112, or other activating feature that can be selectively activated by a person, can be referred to as active-actuation systems, being configured to be actuated actively for actuating one or more safety mechanisms—e.g., locking mechanism, blocking mechanism, and mechanism to hold closed an electrical connection between the source and a load (e.g., alarm(s), resistor(s), etc.), thereby promoting drainage of unwanted electrical charge. The mechanism described primarily in connection with FIGS. 2-8, consists of the prior two mechanisms, the locking and blocking mechanisms.

When the main power to such boxes is turned off—e.g., the main power switch 112 is turned off (and a main lock can here be automatically released), residual power may still be in the system, such as by not having discharged from each sub-unit within the box, or by the system being mis-wired. In this event, personnel accessing the box may be exposed undesirably to the charge, believing that they are safe due to the box being unlocked/openable and/or the switch being turned off.

Some boxes have secondary power feeds, which can be mis-wired so the current therefrom reaches undesirably certain parts of the system 200 with which users could come into contact. An example secondary power feed is identified by reference numeral 105 in FIG. 1. As an example, the system 200 could include a separate alternating (AC) line, such as a 120-volt line (single-phase or three-phase, for instance) and, if a part of the system is mis-wired, its power could back feed into a main machine so that even though a main switch or breaker is switched off, and the mechanical lock released, power could still be supplied to the system. As another example, the system 200 could include a direct current (DC) line, such as in regards to capacitor power cabinets connected to DC motor drives.

Again, personnel accessing the box may be exposed undesirably to the charge, believing that they are safe due to the box opening.

Risk of shock is also present in connection with electrical devices having a local battery source. For instance, in the event of an emergency, charge stemming from the battery could theoretically extend to various parts external and proximate to it.

Regarding temperature and radiation, a common safety system is to use a chromo-sensitive material that changes its appearance when exposed to heat, cold, or radiation, thereby warning people of the condition. Other systems use gages, such as a thermometer or radiometer to warn people. One shortcoming of these methods is that they still allow the people, who may or may not notice the warning, to access the hazardous condition.

There is a need for systems and methods for protecting persons from electric charge and other unwanted conditions (e.g., heat, cold, radiation) in these and similar scenarios.

SUMMARY

The present disclosure relates in one aspect to a system having a transformable material for selectively actuating a safety mechanism to protect against electrical shock. The material is (1) connectable electrically to an electrical component potentially having an unwanted electrical charge and (2) changeable between a temporary shape and an original shape based on electrical input resulting from the unwanted electrical charge at the electrical component. The transformable material is also (3) connected mechanically to the safety mechanism so that change in the transformable material causes movement of the safety mechanism. The transformable material is further (4) configured and arranged in the system to, in response to being exposed to the electrical input, change to its original shape and thereby actuate the safety mechanism.

In one aspect, the present disclosure provides a method, for operating a system to selectively actuate a safety mechanism, to protect against electrical shock, using a transformable material. The method includes closing an electrical switch positioned between the transformable material and an electrical component having the unwanted electrical charge, thereby allowing electrical current caused by the charge to flow from the electrical component to the transformable material. The method also includes receiving, at the transformable material, in response to the electrical switch closing, the electrical current, and the transformable material changing, in response to receiving the electrical current, from a temporary shape to an original shape of the material. The method further includes the transformable material causing, by changing to its original shape, actuation of the safety mechanism.

In one aspect, the present disclosure provides another system having a transformable material for selectively actuating a safety mechanism to protect against electrical shock. In this system, the transformable material is (i) connectable electrically to an electrical component that may eventually have an unwanted electrical charge, (ii) changeable from a temporary shape to an original shape based on electrical input resulting from the electrical charge at the electrical component, (iii) connected mechanically to the safety mechanism so that change of the transformable material causes movement of the safety mechanism, and (iv) configured and arranged in the system to, in response to being exposed to the electrical input, change to its original shape and thereby actuate the safety mechanism. In this aspect, the safety mechanism includes at least one element selected from a group of elements consisting of (a) a movable locking component configured and arranged to, when actuated, lock an access feature associated with the electrical component to limit physical access to the electrical component, (b) a movable blocking element that is configured and arranged to, when actuated by the transformable material, move to a blocking position to limit physical access to the electrical component, and (c) an openable/closable electrical switch positioned between the transformable material and the electrical component and configured and arranged to stay in a closed position, at least when unwanted electrical charge is present, thereby maintaining an electrical connection between the electrical component and a draining sub-system configured and arranged to reduce the unwanted electrical charge in the electrical component.

In a particular embodiment, the safety mechanism in the above-mentioned aspects includes a component holding closed an electrical connection between an unwanted electrical charge and a safety sub-system that drains and/or notifies of the unwanted electrical charge. In one particular embodiment, the safety mechanism in the above-mentioned aspects includes a locking mechanism or a blocking mechanism.

In another aspect, the present disclosure provides a system, for selectively actuating a safety mechanism, to protect against exposure to an unwanted stimulus, using a transformable material. The system includes a biasing element and the safety mechanism. The safety mechanism is configured to be selectively moved, against force of the biasing element, by operation of the transformable material to one of an engaged position and an unengaged position. The system also includes the transformable material, which is in this aspect configured and arranged in the system so that, in operation of the system, when the transformable material is exposed to the stimulus, the transformable material changes from a first form to a second form, thereby causing motion of the safety mechanism. In a particular embodiment, the safety mechanism includes a lock and/or a shield. In a particular embodiment, the stimulus can variously be one or more of heat, lack of heat (e.g., cold), and radiation.

In one embodiment, the present disclosure relates to a system, for selectively actuating a safety mechanism, using a transformable material, to protect against an unwanted condition. The system of this embodiment includes a body and a first connection point connected to the body and including a first pulley device configured to accommodate multiple strands of the transformable material. The system of this embodiment also includes a second connection point connected to the body and including a second pulley device configured to accommodate the multiple strands of transformable material.

In another embodiment, the present disclosure relates to a system, for selectively actuating a safety mechanism, using a transformable material, to protect against an unwanted condition. The system of this embodiment includes a body and a first connection point connected to the body and including a first pulley device configured to accommodate the transformable material. The system of this embodiment also includes a second connection point connected to the body and including a second pulley device configured to accommodate the transformable material. The system further includes an overload-protection sub-system, for protecting the transformable material.

In still another embodiment, the present disclosure relates to a system, for selectively actuating a safety mechanism, using a transformable material, to protect against an unwanted condition. The system includes a first biasing element and the safety mechanism configured to be selectively moved, against force of the first biasing element, by operation of the transformable material to one of an engaged, or protecting, position and a non-protecting, or unengaged, position. The system of this embodiment also includes a manual-release sub-system configured to allow a user to selectively de-activate the safety mechanism. The manual-release sub-system includes a first mounting part connected to the body and a second mounting part positioned movably within a cavity of the body. The manual-release sub-system further includes a second biasing component extending between the first mounting part and the second mounting part.

Other aspects of the present invention will be in part apparent and in part pointed out hereinafter.

DESCRIPTION OF THE DRAWINGS

FIG. 8 illustrates the sub-system of FIG. 7 in an actuated state, while the main system power switch is turned off, according to an embodiment of the present technology.

FIG. 9 illustrates a sub-system, for automatically locking an electrical system, having a triggering component, in an unactuated state, according to a third embodiment of the present technology.

FIG. 10 illustrates a first example triggering component, in an unactuated state, for the sub-system shown in FIG. 9.

FIG. 11 illustrates the first example triggering component of FIG. 10 in an actuated state.

FIG. 12 illustrates a second example triggering component, in an actuated state.

FIG. 13 illustrates a third example triggering component, in an unactuated state, for the sub-system shown in FIG. 9.

FIG. 14 illustrates the third example triggering component of FIG. 13 in an actuated state.

FIG. 15 illustrates the sub-system of FIG. 9 in an actuated state, according to an embodiment of the present technology.

FIGS. 16 and 17 illustrate a sub-system, for automatically locking a system in response to a predetermined stimulus, according to another embodiment of the present technology.

FIG. 20 shows the system of FIGS. 18 and 19 following operation of a manual release.

FIG. 21 shows a perspective view of the system of FIGS. 18-20 in an unactuated state like FIG. 18.

FIG. 22 shows a close-up view of a lower portion of the system in the perspective of FIG. 21.

FIG. 23 shows a close-up perspective view of a lower system portion, like that of FIG. 22, but for an alternate system.

FIG. 25 shows a close-up perspective view of an upper portion of the system shown in FIG. 13.

FIG. 26 shows a close-up perspective view of an upper portion of the system shown in FIGS. 23 and 24.

FIG. 28 shows a close-up perspective view of a lower portion of the system, shown in FIG. 27, in an actuated, locked, state.

FIG. 29 shows power-disconnect blade contacts and a housing modified with a secondary set of contacts for connecting a system, being protected, to a safety mechanism (e.g., safety latch).

FIG. 30 shows a circuit having a current-limiting resistor being linked to an input charge and in series with a transformable material (e.g., SMA—Shape-memory alloy) and an electrical ground FIG. 31 shows a circuit, which can be referred to as a resistive-voltage-divider arrangement, having a transformable material divided from an input charge by a first resistor and a second resister.

FIG. 32 shows a circuit, which can be referred to simply as a diode-in-series arrangement, having a diode in series between a resistor and a transformable material.

FIG. 33 shows a circuit, which can be referred to simply as a diode-in-parallel arrangement, having a resistor, a transformable material (SMA), a diode, and an electrical ground, wherein the SMA is in parallel with the diode.

FIG. 34 shows a circuit, which can be referred to as a diode/resistor-in-parallel arrangement, having a first resistor, a transformable material (e.g., SMA), a diode, a second resistor, and an electrical ground, wherein the transformable material is in parallel with a series combination of the diode and the second resistor.

FIG. 35 shows a circuit having a positive temperature coefficient (PTC) switch in series with a transformable material.

FIG. 36 shows a circuit having a bi-metal self-resetting breaker in series with a transformable material and a resistor.

FIG. 37 shows a circuit having an audible indicator and a resistor in series with a transformable material.

DETAILED DESCRIPTION

Figure 1:
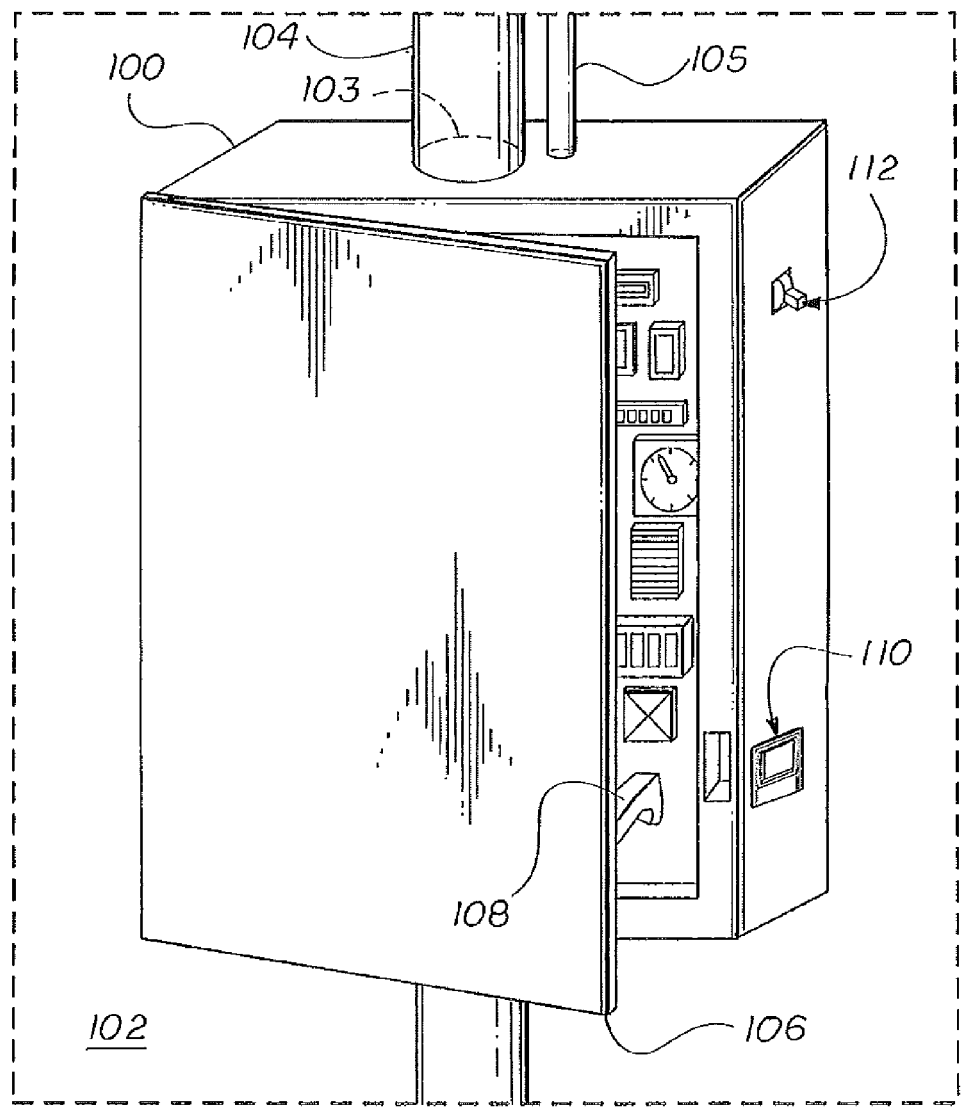
FIG. 1 illustrates a conventional breaker or control box.

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

Descriptions are to be considered broadly, within the spirit of the description. For example, references to connections between any two parts herein are intended to encompass the two parts being connected directly or indirectly to each other.

As another example, a single component described herein, such as in connection with one or more functions, is to be interpreted to cover embodiments in which more than one component is used instead to perform the function(s). And vice versa—i.e., description of multiple components described herein in connection with one or more functions is to be interpreted to cover embodiments in which a single component performs the function(s).

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to employ the present disclosure.

Overview of the Disclosure

The present technology makes use of transformable materials, such as smart materials and, more particularly in some embodiments, those commonly referred to as shape-memory alloys (SMAs). In some embodiments, the transformable material can be readily deformed when at a low temperature but, when above their transformation temperature, transforms to a much stronger state (for shape-memory alloys this can be approximately a 2.5 times increase in modulus).

In various particular embodiments, the present disclosure describes systems and methods for actuating safety locks, shields, and alarms using a transformable material. The disclosure also describes systems and methods for removing unwanted electric charge from a local source, such as a battery, using the smart material.

Generally, transformable materials, such as smart materials, are those having one or more properties that can be changed in a controlled fashion by external stimulus, such as temperature, electric field, stress, magnetic field, or pH level. Common smart materials include piezoelectric materials, shape-memory alloys, shape-memory polymers, magnetostrictive materials, magnetic shape-memory alloys, pH-sensitive polymers, temperature-responsive polymers, and chromic materials.

While transferable materials are referred to herein mostly as smart materials for convenience, uses of the term smart are not intended to limit the material to being a certain type of transformable material, and references herein to smart materials should be considered to include broader readings whereby the material can be a transformable material other than what might be considered by some as only a smart material.

Most embodiments of the present disclosure use smart materials configured to change shape responsive to electrical or heat input. Common smart materials of this type are shape-memory alloys.

A shape-memory alloy is a metal alloy that remembers a cold-forged shape. This shape may also be referred to as an original, initial, or permanent state. The alloy, if deformed from this original shape by an applied load will work against the load to return to the original shape, i.e., exhibit shape memory, in response to being exposed to an input of heat or electric current. Shape-memory alloys are commonly known by names including SMA, smart metal, memory metal, memory alloy, muscle wire, and smart alloy.

In some embodiments, the present technology involves connecting the smart material to a part having an unwanted electrical charge. An example part is a power box line having unwanted residual charge, such as from electricity that remains in components of the box after power to the box has already been disconnected.

In another example, there is at least one secondary source of power for the box, such as a small power line (e.g., auxiliary power line 105) distinct from a main power line (e.g., main power line 104). In still another example, unwanted charge exists in a system, or electrical sub-system thereof, stemming from a local power source, such as a battery.

The technology also includes one or more security mechanisms connected to the smart material. The security mechanisms are configured and arranged with respect to the smart material to be actuated by the smart material.

In response to the smart material being connected to the electrified part, current enters the material causing it to change from its temporary deformed state to its initial, permanent shape. By changing shape, the smart material actuates the associated security mechanism, such as by pulling a security lock into place, moving a cover plate or shield into a position blocking user access to electrified components, and/or keeping closed a circuit draining unwanted charge.

The system can also include an electrical ground connected to the component having the unwanted charge. The smart material can be connected between the charged component and the ground (e.g., through a load such as a resistor, alarms, an inductive coil, etc.) and/or hold together the connection between the charged component and the ground.

As referenced, the system in some embodiments includes one or more alarms connected in the circuit between the electrified part and the ground. Example alarms include visual alarms, such as a light, and audible alarms, such as a siren or horn and also provide a passive means of reporting to a monitoring system. In some embodiments the monitoring system can be any central computerized and/or manned system for tracking and notifying personnel and/or other systems of relevant events.

A relevant event could be, for instance, a safety system including a smart material being engaged in response to stimulus such as (i) Joule heating from an unwanted electric current, (ii) unwanted ambient or environmental temperature change, such as heat from a fire or engine compartment (e.g., a radiator) or from a cryogenic environment, such as a container or room housing liquid nitrogen, or (iii) unwanted radiation. The monitoring system in some embodiments includes a remote processing center, such as the OnStar® system (OnStar is a registered trademark of OnStar, LLC, a subsidiary of the General Motors Company).

Benefits of the present technology include protecting persons from an undesired condition, e.g., an unwanted electrical shock, by one or more of automatically locking an enclosure, blocking access to charged components, providing a visual or audible notification of the unwanted charge, and draining the charge. In some embodiment, other benefits include providing such protections using an unwanted element, e.g., unwanted electricity, and so without use of, and so conservation of, other energy, e.g., other electricity.

The provision can also in each case be made without cost or other burdens related to complex devices such as a computer processing unit. As still another benefit, the technology of some embodiments of the present technology are configured and arranged to perform their desired functions (e.g., lock, block, drain, warn) not only automatically, but also until the performance is no longer needed—that is, until the unwanted charge or other condition has been removed or alleviated.

Figure 2:
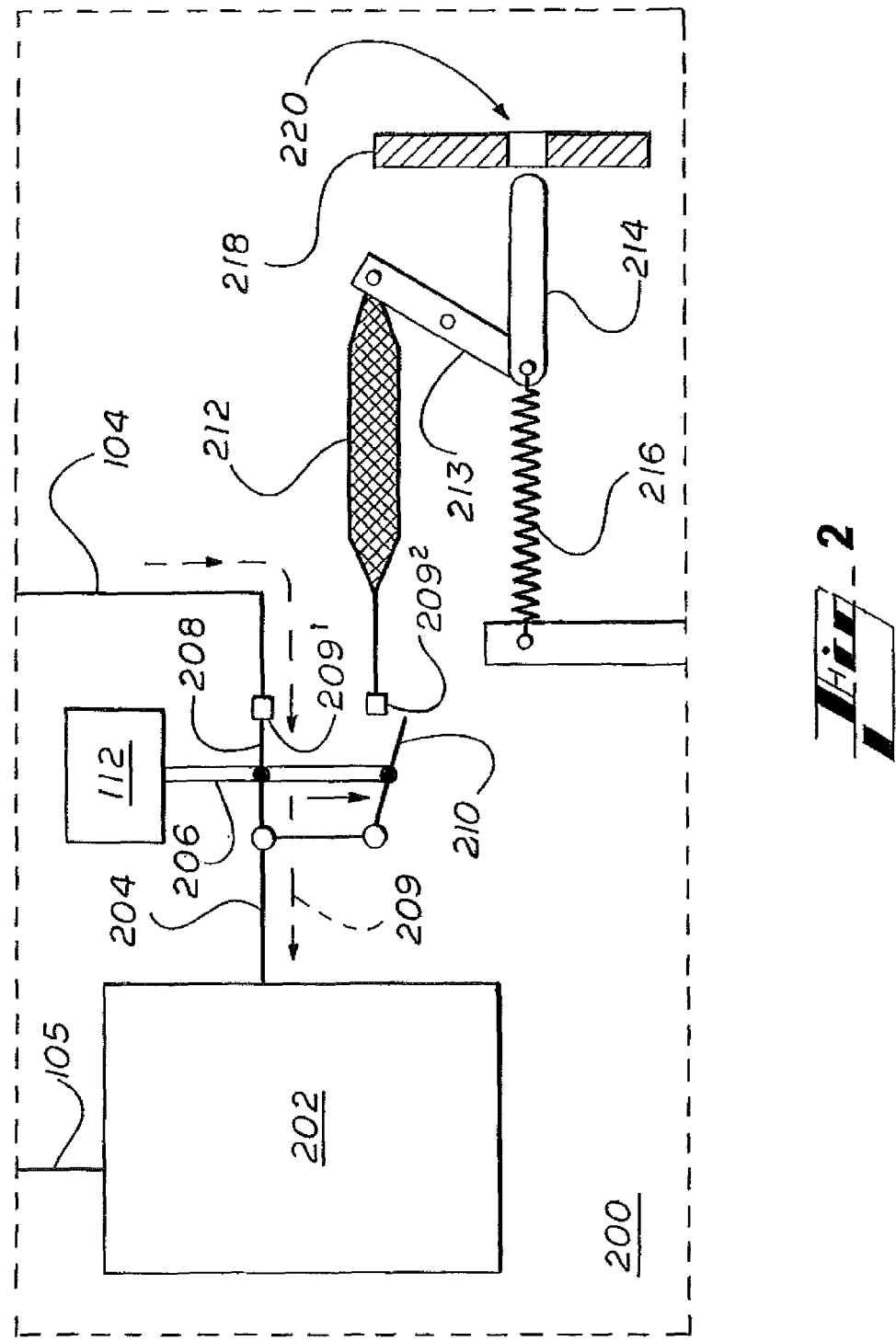
FIG. 2 illustrates a sub-system, for automatically locking an electrical system, in an unactuated state, while a main system power switch is turned on, according to a first embodiment of the present technology.

FIG. 2—First Exemplary Layout in Powered Mode

With continued reference to the figures, FIG. 2 illustrates a schematic block diagram of an environment or system 200 in which the present technology is implemented. For some embodiments, the components shown in FIG. 2 are all a part of a single apparatus, such as an electrical power or control box.

The system 200 includes at least one system component 202 powered by electricity received from a power input 104, such as the power line 104 shown in FIG. 1. The system component(s) 202 can include any of a wide variety of electrical devices or parts, such as fuses, computing circuitry, capacitor banks (groups of capacitors grouped together to build a larger charge), electrical motor drives and brakes, temperature controls, and programmable logic controllers (PLCs).

An electrical connection, or line, 204 connecting the input 104 and the system component 202 is selectively openable/closable. As an example, in one embodiment, the connection can be opened and closed by way of an actuator 112, such as the power switch 112 shown in FIG. 1. With the actuator 112 in an on position, as shown in FIG. 2, a link 206 connected to, or being a part of, the actuator 112 holds a first electrical switch 208 in a closed position, as also shown in FIG. 2. The link 206 includes one or multiple parts.

The first electrical switch 208 is connected to, or a part of, the connection line 204, and connected between the system component 202 and the power input 104. With the first electrical switch 208 closed, as shown in FIG. 2, current 209 flows from the power input 104 to the system component 202.

In some embodiments, the electrical line 204 is considered a part of the electrical component 202. For instance, in embodiments that operate to limit access to the electrical component to ward against a person being shocked (see e.g., FIGS. 4 and 8), the protections can be said to limit access by the person to the electrical component, generally, which can include conducting parts connected electrically to the electrical component 202, such as the lines 204, 210 (see e.g., FIG. 8). The electrical component 202 in some cases includes one or numerous conducting parts that can carry unwanted charge.

The system 200 is also configured such that when the power switch is in the on position, a second electrical switch 210 is open. The second electrical switch 210 is connected between the component 202 and a transformable material 212, such as a smart material.

Figure 3:
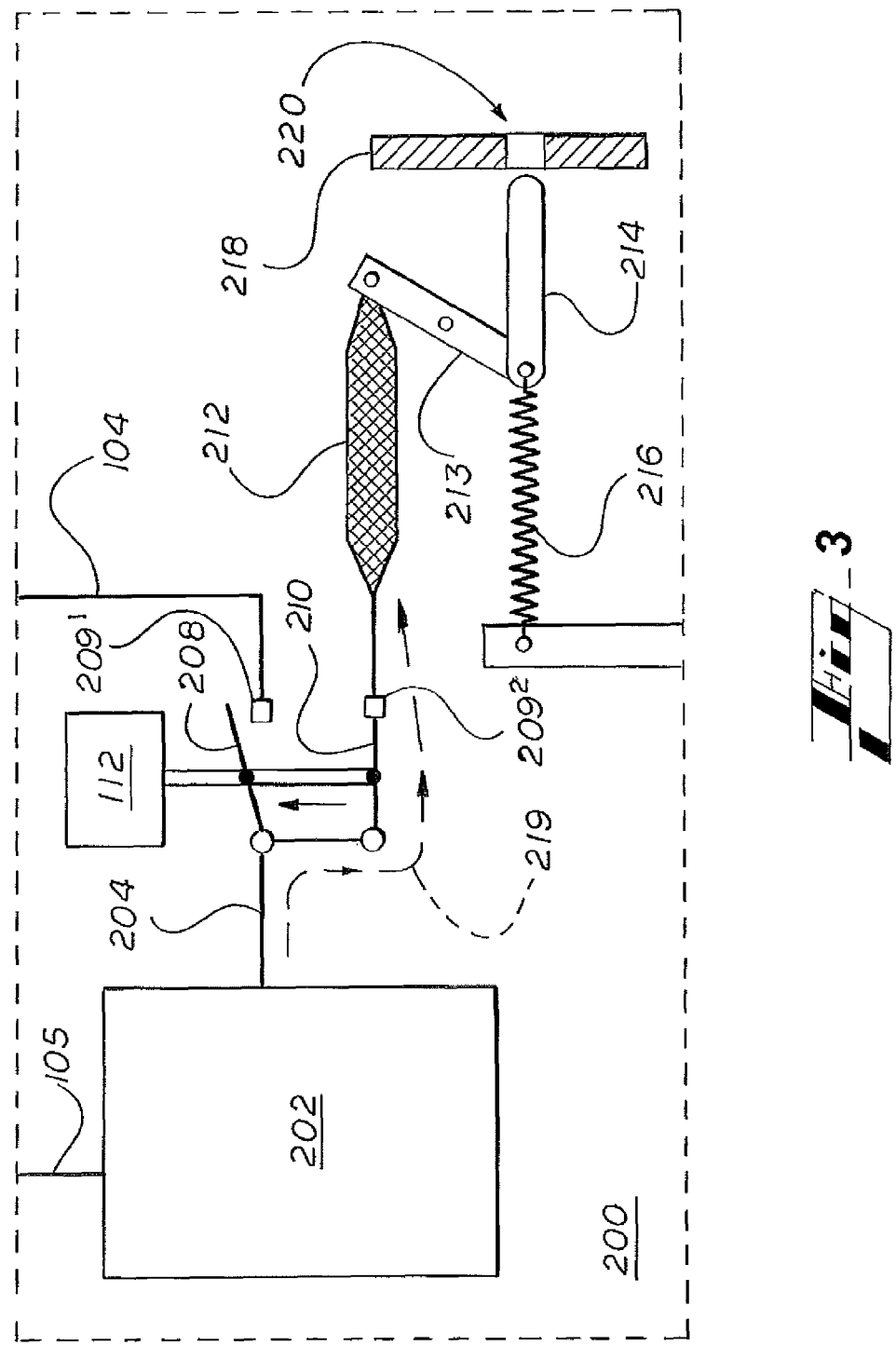
FIG. 3 illustrates the sub-system of FIG. 2 in an unactuated state while the main system power switch is turned off, according to an embodiment of the present technology.

Exemplary smart materials for use in this aspect, e.g., shape-memory alloys, are described above. As shown schematically in FIGS. 2 and 3, the link 206 is configured and arranged to (i) effect closing of the first electrical switch 208 and, simultaneously, opening of the second electrical switch 210, when the power switch 112 is in its on position (FIG. 2) and (ii) effect opening of the first electrical switch 208 and simultaneously closing of the second electrical switch 210, when the power switch 112 is in its off position (FIG. 3).

The smart material 212 is connected directly or indirectly to a security mechanism, such as a locking component 214. In the example of FIG. 2, the smart material 212 is connected to the locking component 214 by way of an intermediate component 213. In this example and other embodiments, the intermediate component 213 operates to translate a first motion of the smart material to a second motion of the locking component 214, as described further below.

In some embodiments, the locking component 214 is biased toward the unlocked position shown in FIG. 2 by a biasing component 216, such as a tension spring. The biasing component 216 could alternatively or in addition include other springs, such as a coil spring, or a non-spring biasing device.

The locking component 214 can include any common locking parts such as a latch or a pin, as shown by way of example in FIG. 2. The locking part of the locking component 214 is connectable to or engageable with a complementing part 218, such as a plate or other securing component having a receptacle 220 for receiving a latch or pin. The complementing part 218 is a part of the security mechanism actuated by the smart material 212 and, in some embodiments, the complementing part 218 is considered a part of the locking component 214. In some embodiments, the smart material 212 is considered a part of what is referred to as the security mechanism, actuating selectively other parts of the security mechanism, while in others it can be considered to connect to and actuate selectively distinct parts of the security mechanism.

FIG. 3—First Exemplary Layout Depowered

In response to the actuator 112 being switched to an off position, as shown in FIG. 3, connection between the power input 104 and the component 202 is cut off. Particularly, as shown, in response to the switch being switched to its off position, the link 206 (a) moves the first electrical switch 208 to a disconnected position, breaking/opening the connection between the input 104 and component 202, and (b) moves the second electrical switch 210 to a connected position, closing a connection between the component and the smart material.

With the second electrical switch 210 closed, any unwanted electrical charge present in the system component 202 flows as current 219 from the system component 202 through the second electrical switch 210 to the smart material 212, as shown in FIG. 3.

Figure 4:
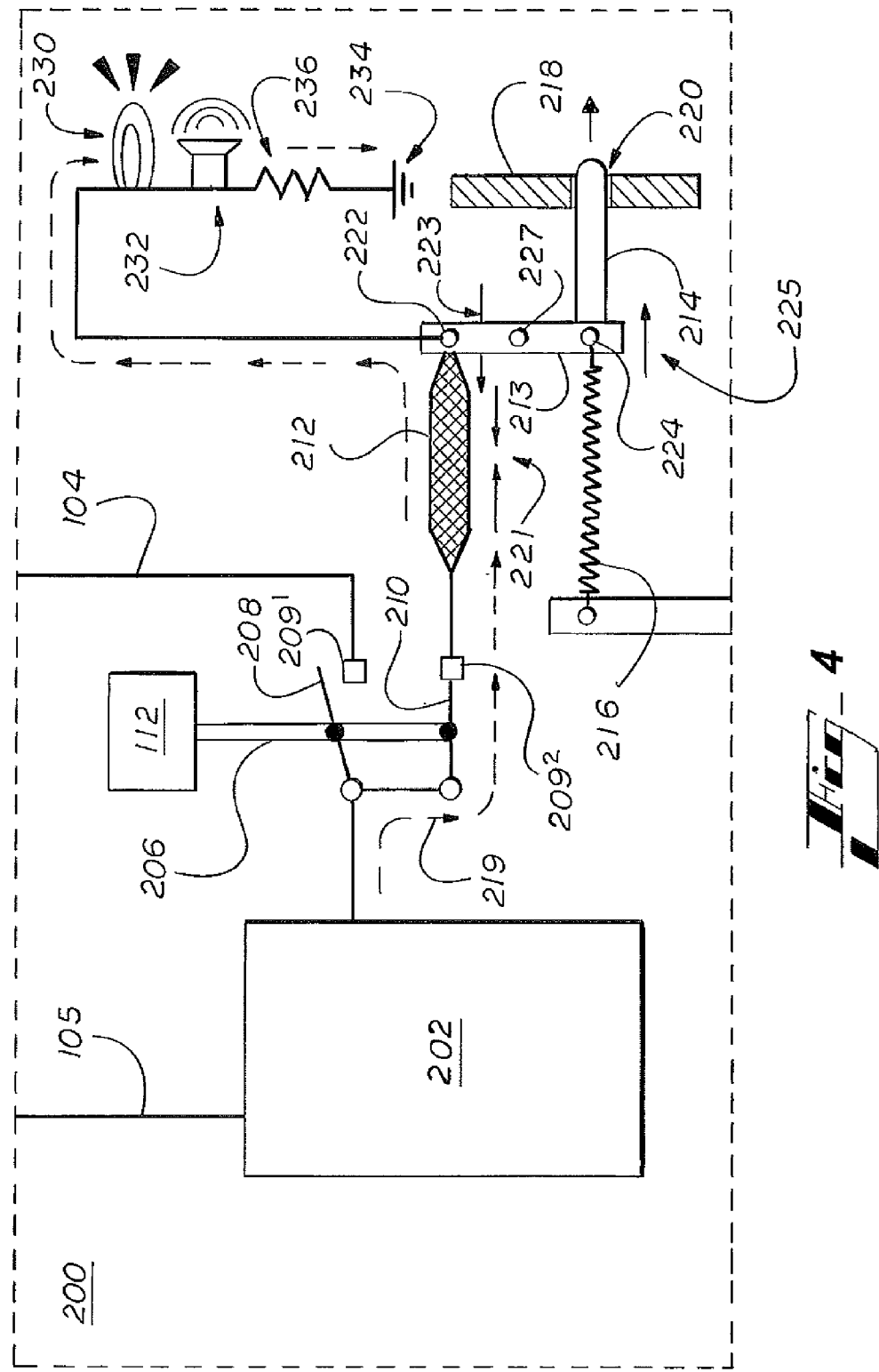
FIG. 4 illustrates the sub-system of FIG. 2 in an actuated state, while the main system power switch is turned off, according to an embodiment of the present technology.

FIG. 4—First Exemplary Layout with Safety Mechanism Activated

In response to the smart material 212 being connected to the electrified system component 202, the current 219 enters or at least affects (e.g., heats) the material 212 causing the material to return from its deformed shape shown schematically in FIGS. 2 and 3, to its initial, original, or permanent shape, shown in FIG. 4. The deformation is shown schematically by arrows labeled by reference numeral 221.

As shown in FIG. 4, the smart material 212 is connected to a first joining part or portion 222 at, adjacent, or near an intersection of the smart material 212 and the intermediate component 213. In the illustrated example, the part includes a rotational-linear feature allowing the smart material and intermediate component 213 to move with respect to each other angularly and linearly. The example linear movement caused at the first joining part or portion 222 by the smart material 212 deforming is shown by an arrow labeled by reference numeral 223 in FIG. 4.

The intermediate component 213 in turn rotates (counter-clockwise in the schematic view of FIG. 4) about a pivot 227 causing movement of a second joining part or portion 224. Like the first, the second joining portion of this example also includes a rotational-linear feature. By the first joining portion 222 rotating and moving to the left (arrow 223), the second joining portion 224 is caused to rotate and move to the right as shown by an arrow labeled by reference numeral 225 in FIG. 4. Directional indicators, such as left, right, up, down, provided herein are arbitrary and given for ease of description and understanding concepts of the present technology.

The second joining portion 224 moving to the right, in the schematic view of FIG. 4, causes the locking component 214 to also move toward the right. The locking component 214 moving sufficiently toward the right engages the complementing lock part 218, such as a plate, by entering a receptacle 220 thereof. The complementing lock part 218 is secured into place, at the position shown schematically in FIG. 4, by mating with (e.g., receiving) the locking component 214.

The parts connecting the smart material 212 and the locking component 214 can be referred to generally as intermediate parts. These include at least the intermediate component 213 in the illustrated embodiment. The first joining portion 222 can be a part of the intermediate parts or of a sub-system including the smart material 212. The second joining portion 225 can be a part of the intermediate parts or of a sub-system including the locking component 214.

In some embodiments, there are no intermediate parts. Rather, the smart material 212, which can include ancillary connecting features such as the first joining portion 222, as described, is effectively connected directly to a safety mechanism, such as the locking component 214 in the example of FIGS. 2-5, wherein the locking component can include ancillary connecting features such as the second joining portion 224, as also described.

It will also be appreciated that intermediate parts illustrated are merely schematic representations of various forms of intermediate parts, beyond just a pivot arrangement. In a contemplated embodiment, for example, the intermediate parts include a rack-and-pinion arrangement. For instance, a pinion can be associated to rotate with movement of the smart material due to its deformation and a rack can be connected to both the pinion and the locking component 214 so that the rack translates linearly in response to rotation of the pinion.

The smart material 212 is in some embodiments considered a part of a charge drain or relief sub-system. A function of the sub-system is to drain or alleviate unwanted charge in a system, e.g., the system 200, such as, particularly, for example, unwanted charge from the electrical component(s) 202. In some embodiments (not shown in detail in FIG. 2), the smart material 212 is not a part of the charge drain or relief sub-system.

As referenced above, the system 200 in some embodiments includes one or more alerts or alarms 230, 232. The alarms 230, 232 are connected in-circuit to the electrical component 202 in response to the smart material 212 being actuated or otherwise while the smart material 212 is actuated. For instance, in the example of FIGS. 2-4, the alarms 230, 232 are connected to the electrical switch 210 so that when the switch 210 is moved from its open position (FIGS. 2 and 3) to its closed position (FIG. 4), the current 219 draining from the electrical component 202 flows to the alarms 230, 232.

The alarms 230, 232 can be positioned in various positions with respect to the smart material 212. For instance, while they are shown in FIG. 4 positioned between the smart material 212 and an electrical ground 234, the figures and description are also to be considered to provide one or more of the alarms 230, 232 being positioned between the smart material 212 and the electrical switch 210.

While two alarms are shown, the alarms 230, 232 in some embodiments include any number of distinct or combined alarm devices. The alarm devices portrayed by way of example include a visual alarm 230, such as a light, and an audible alarm 232, such as a horn or a siren.

In some embodiments, the alarms 230, 232 can be considered to include a monitoring system or a connection to such a monitoring system for providing signals (e.g., electrical signal), a message (e.g., e-mail, phone message), a sound, a light, etc., to such a monitoring system. In some embodiments the monitoring system can be a central computerized and/or manned system, such as one for tracking and/or notifying personnel and/or other systems of relevant events.

A relevant event could be, for instance, a safety system including an SMA being engaged in response to stimulus such as (i) Joule heating from an unwanted electric current, (ii) unwanted ambient or environmental temperature change, such as heat from a fire or from a cryogenic environment, such as a container or room housing liquid nitrogen, or, (iii) unwanted radiation. The monitoring system in some embodiments includes a remote processing center, such as the OnStar® system referenced above.

In some embodiments in which the alarms 230, 232 are present and positioned to receive current 219 stemming from the unwanted charge of the electrical component 202, the alarms are considered a part of the charge drain or relief sub-system mentioned above. The relevant alarms thus contribute to the function of draining or alleviating unwanted charge in the system 200 and, particularly, for example, unwanted charge at the electrical component(s) 202. The alarms do this by drawing some of the current for their operation.

The aforementioned electrical ground 234, when present, is also considered a part of the charge drain or relief sub-system mentioned above, contributing to the function of draining or alleviating unwanted charge from the system 200 and, particularly, for example, from the electrical component(s) 202.

The system 200 can also include one or more resistors 236. The resistor 236 can be positioned in various positions with respect to the smart material 212. For instance, while it is shown in FIG. 4 positioned between the smart material 212 and the electrical ground 234, the figures and description are also to be considered to provide one or more resistors 236 positioned between the smart material 212 and the electrical switch 210. In embodiments in which the resistor 236 is present and positioned to receive current 219 stemming from the unwanted charge of the electrical component 202, the resistor 236 is considered a part of the charge drain or relief sub-system mentioned above. Relevant resistors 236 thus contribute to the function of draining or alleviating unwanted charge in the system 200 and, particularly, for example, unwanted charge at the electrical component(s) 202. The resistor 236 does this by drawing some of the current by way of its resistive properties.

While shown schematically within the system 200, it will be appreciated that the electrical ground 234 or parts thereof may be external to the system 200. This same possibility exists for each of the parts described and shown in connection with the systems provided. For example, any one or more of the parts of the systems 200, 700, 900 shown in FIGS. 2-4 and 6-17, and of other systems described herein, can be completely or partially within the system or completely or partially outside of and connected to the system. In addition to the example of the electrical ground 234 being partially or completely outside of and connected to the system 200, any of the electrical component 202, the alarms 230, 232, the resistor 236, and all or some of the security mechanism (e.g., the complimenting lock component 218/220) can be partially or completely outside of and connected to the system 200.

In some embodiments, the system 200 is configured and arranged so that movement of the smart material 112 by its shape recovery (shape memory) acts to hold closed a connection (e.g., the second electrical switch 210) between the electrical component 202 and the drain or relief sub-system. This function can be seen in the schematic visualization of FIG. 14. By this arrangement, connection between the electrical components and drain/relief sub-system components is maintained as long as there is unwanted charge flowing to the smart material 212 causing it to remain in its undeformed state, e.g., constricted as compared to a pseudo-plastically deformed shape. In such embodiment, when the unwanted charge is removed or reduced sufficiently, the smart material 212 will be stretched by the biasing element (e.g., the biasing element 216 shown in FIG. 8) to return to or at least markedly toward its as-installed, stretched, shape, and thereby the smart material 212 will completely stop or to an extent stop holding closed the connection between the electrical component and the drain/relief sub-system. Operation of the components shown in FIG. 14 is described below in more detail.

Figure 5:
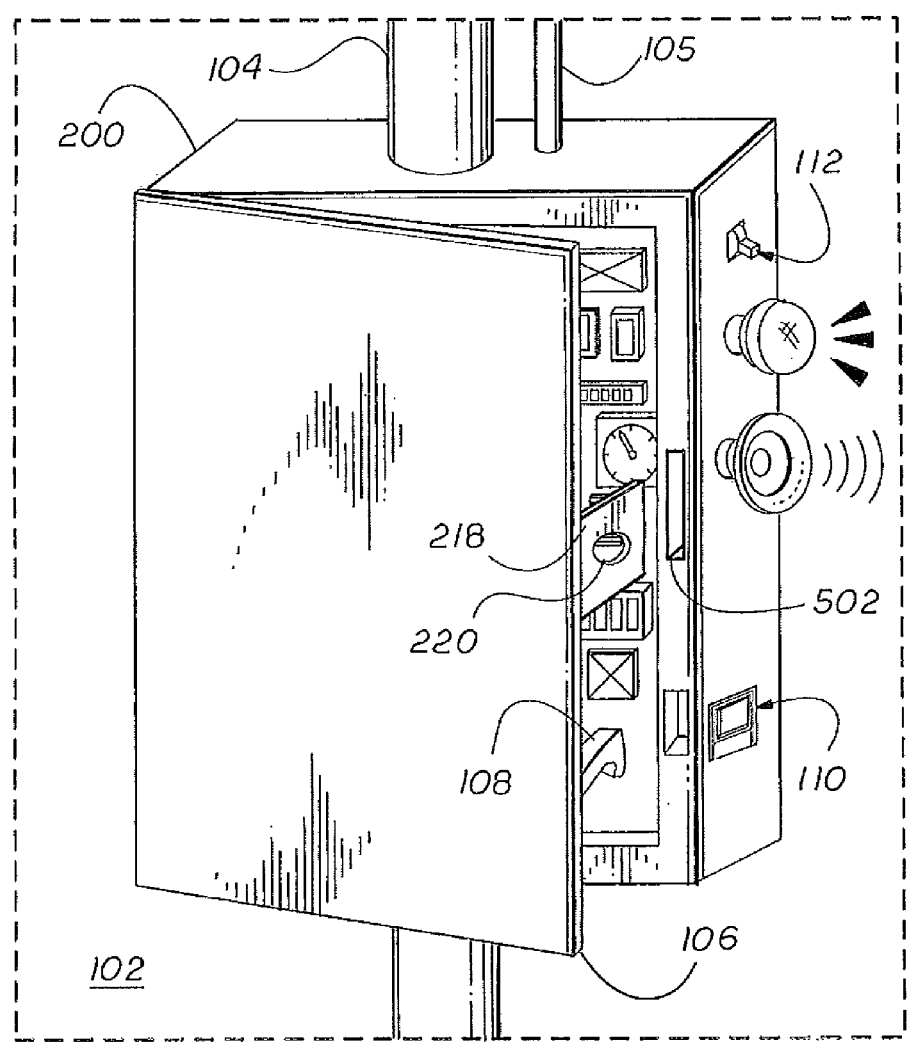
FIG. 5 illustrates a breaker or control box according to the present technology.

FIG. 5—Exemplary Control Box

FIG. 5 shows an exemplary system 200 in the form of an electrical box, such as a control or power box. The complementing lock part 218 and the receptacle 220 are shown connected to a door 106 of the system. In one embodiment, the system 200 includes a partial or complete housing having an opening 502 sized and shaped to receive the complimentary locking part 218. The parts and the operation of the system 200 shown in FIGS. 2-5 are described further below in connection with FIG. 6.

Figure 6:
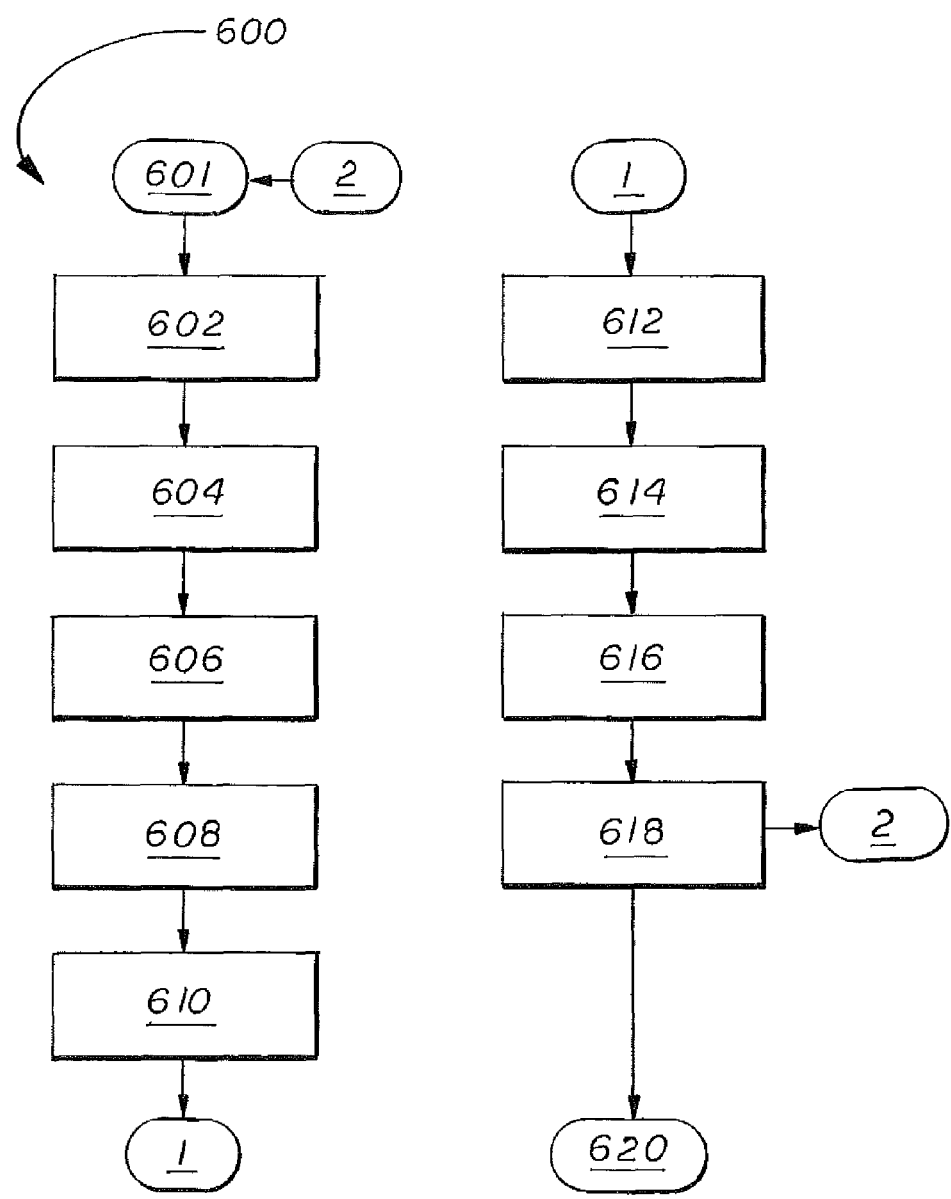
FIG. 6 illustrates a method of operation of the systems described herein.

FIG. 6—Exemplary Method of Operation

FIG. 6 shows an exemplary method 600 of operation of the technology of the present disclosure. It should be understood that the steps of the method 600 are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the illustrated method 600 can be ended at any time.

The method 600 begins and flow proceeds to block 602, whereat power to the system 200 can be turned on, such as by the switch 112 being turned to its on position, thereby allowing power to flow to the system 200 via the primary power input 104 (components shown in FIGS. 2-5). In one embodiment, when the door 106 is closed and the power to the system 200 is turned on, the door 106 is locked from being opened. In this case, for example, the door 106 may be held from opening by the conventional lock 108. And, in this case, the conventional lock release 110 is disabled or its usual unlocking effect otherwise blocked.

At block 604, power to the system 200 is turned off, such as by the switch 112 being turned to its off position, thereby stopping flow of power from the primary power input 104 to system 200. In some embodiments, this switching action also causes disengagement of the conventional lock (e.g., lock 108). As described above and shown in connection with FIGS. 2 and 3, the power-off function disconnects a first link 208 to the electrical component 202 and connects a second link 210 to the electrical component 202.

In response to the power being turned off, and the second link 210 being closed, at block 606, any unwanted charge, in the electrical component 202, that is connected electrically to the electrical line 204, begins to flow, as the described current 219 (shown in FIGS. 3 and 4), through the line 204, through the second link 210, and towards the smart material 212.

As provided, the unwanted charge can exist from one or more of various reasons. For instance, a residual power may still be in the system 200 by not having discharged from each of one or more sub-units of the system 200 (e.g., electrical components 202). In this event, personnel accessing the box may be exposed undesirably to the charge, believing that they were safe due to the box being unlocked. As another example source of unwanted charge, some systems (e.g., power or control boxes) have secondary power feeds—e.g., power line 105, in addition to the primary power feed 104 shown in FIGS. 1-5.

Whatever the source(s) of the unwanted charge in the system (e.g., electrical component 202), absent operation of the present technology, components of the system 200 (e.g., power box) can remain charged even after the main switch is tripped and the mechanical lock released. In that conventional case, persons accessing the box could be exposed undesirably to the charge, believing that it was safe to access the box due to the box opening and/or the switch being turned off.

At block 608, the electric current 219 (FIGS. 3 and 4) reaches the smart material 212 and the smart material 212, in response, drives to return to its undeformed state in response. More particularly, for example, as referenced above, in response to the smart material 212 being connected to the electrified component 202, the current 219 enters or at least affects (e.g., heats) the material 212, causing the material to return from its pseudo-plastically deformed shape, shown schematically in FIGS. 2 and 3, to its undeformed, permanent shape, shown schematically in FIG. 4. The deformation recovery is shown schematically by arrows labeled by reference numeral 221 in FIG. 4.

At block 610, the deformation recovery of the smart material 212 overcomes the biasing element(s) to actuate a safety mechanism, such as the locking features 214, 218, 220, or a blocking feature (e.g., cover or shield), as described above. The system 200 can include one or more intermediate parts, such as a pivot or a rack-and-pinion arrangement, actuation of the smart material causes actuation of the intermediate part(s), and actuation of the intermediate part(s) causes actuation of the safety mechanism.

While the safety mechanism actuated by smart material 212 deformation recovery in the embodiments shown in FIGS. 2-5 includes the locking features 214, 218, 220, the safety mechanism actuated by such deformation recovery in the embodiment shown in FIGS. 7 and 8 includes a cover, shield, or other blocking component, as described in more detail below in connection with those figures.

In the embodiment of FIGS. 9-10, the safety mechanism includes holding closed a connection between the electrical component 202 and a drain/relief sub-system including the smart material 212, so that current from unwanted charge can flow between the component 202 and sub-system until the unwanted charge is removed or reduced, as described in more detail below in connection with those figures.

At block 612, the electrical current 219 from the unwanted charge reaches alarms 230, 232, which are described above. The alarms operate to warn personnel in one or more ways, such as by visual or sound warnings, that unwanted current is still present in the system 200.

At block 614, the electrical current 219 from the unwanted charge reaches other parts such as one or more resistors 236 and an electric ground 234.

As provided, above, various components described herein can have various functions. For instance, the smart material 212 can operate to actuate one or more safety mechanisms (e.g., move and hold in place a lock, a cover, and/or an electrical connection (to promote charge drainage)) as well as to dissipate the unwanted charge and current. Other features described as dissipating the unwanted charge and current (i.e., part of a charge drain or relief sub-system) include the alarms, the resistor, and the electrical ground.

At optional block 616, charge, and preferably all charge, is drained from the system 200—e.g., the electrical component(s) 202. Step 616 is referred to here as optional because in some scenarios, the unwanted charge is of such an amount that it will not be readily drained. For instance, in the example of the box being powered by a secondary source (e.g., the separate AC line, such as a 120-volt line), and that secondary source being mis-connected, the charge of the secondary source will not likely be fully drained by the smart material 212 and other components of the present technology, or at least not for a long time.

For cases in which act 616 is effected, the current 219 previously flowing to the smart material 212 is gone or decreased to such a degree so that the smart material 212 changes back toward its as installed deformed shape (the deformed shape shown in FIGS. 2 and 3) under action of the biasing element 216. In response, the safety mechanism(s) (e.g., move and hold in place a lock, a cover, and/or an electrical connection (to promote charge drainage)) is released. This release, or return, is in some embodiments facilitated by return bias provided by the bias feature 216 such as the tension spring described above.

As another result of the current stopping or becoming sufficiently low at block 616, in some embodiments, any previously-actuated alarms would stop providing their alert notice.

In a contemplated embodiment, the method 600 also includes an act 618 of analyzing, diagnosing, and possibly performing maintenance on the system. The maintenance can include, for example resetting or replacing features of the safety technology described herein. The analysis and diagnostic functions could include determining that the unwanted charge was caused by mis-wiring associated with the secondary input power line 105. Follow-up maintenance could include correcting the mis-wiring.

The process 600 can end 620 or be repeated as indicated by the return line identified by link 2 in FIG. 6.

Figure 7:
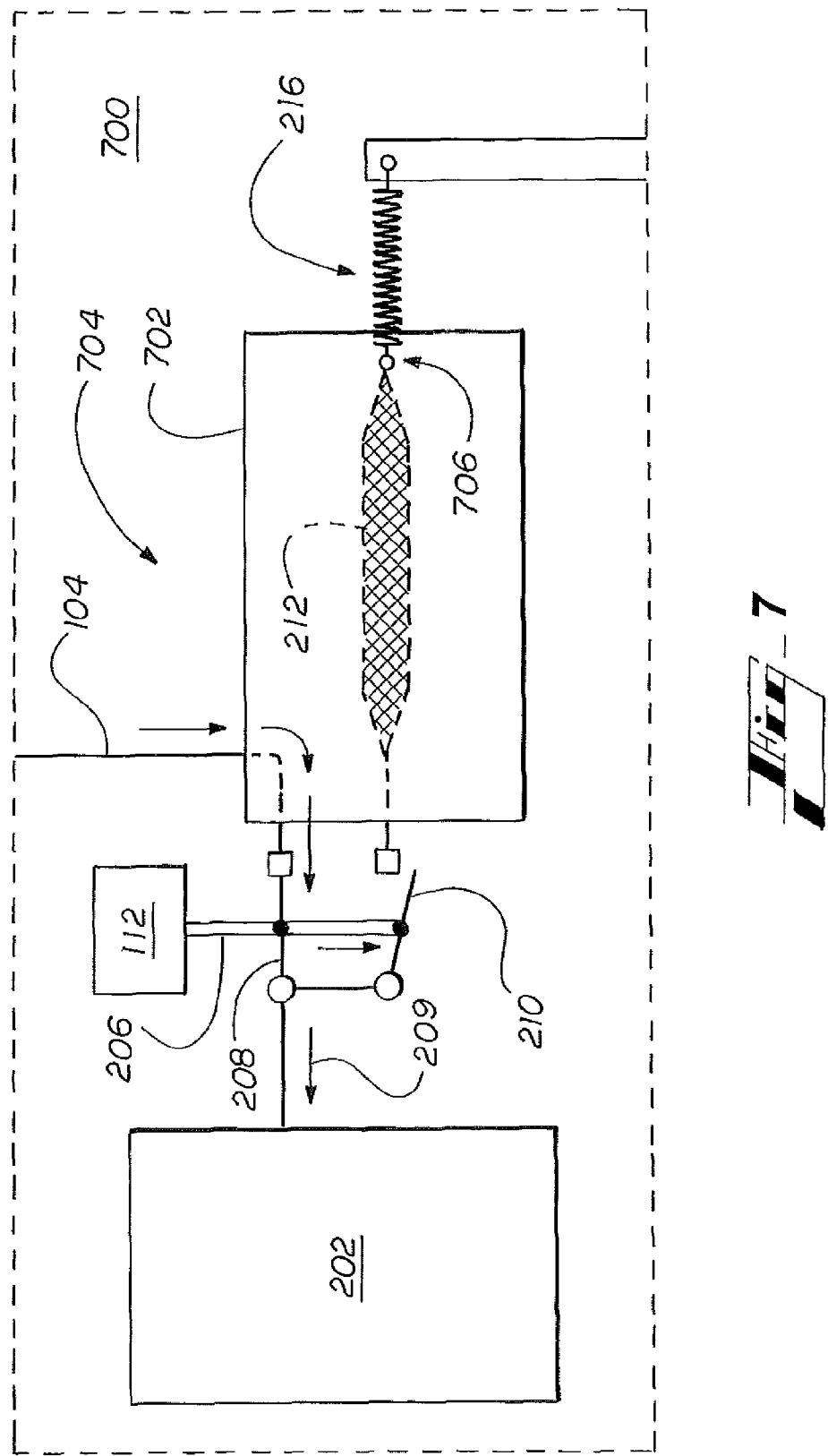
FIG. 7 illustrates a sub-system, for automatically shielding components, in an unactuated state, while a main system power switch is turned on, according to a second embodiment of the present technology.

FIGS. 7 and 8—Second Exemplary Layout

FIGS. 7 and 8 show an exemplary system 700 according to another embodiment of the present technology, unactuated and actuated, respectively. This embodiment, including a blocking cover, or shield, was referenced above.

The embodiment of FIGS. 7 and 8 is the same or similar in many ways to the embodiment of FIGS. 2-5. Common features are identified in the figures by common reference numerals. Common features and functions are not described again here for brevity and the above discussion about the same should be considered incorporated into this portion about the embodiments of FIGS. 7 and 8.

A primary difference between the embodiments is that in place of showing the locking features (e.g., features 214, 218, 220 in FIGS. 2-5), FIGS. 7 and 8 show a blocking or cover feature 702. While this feature is referred to herein for simplicity as the cover 702, the form of the feature is not limited to what might be conventionally thought of as a cover. The feature 702 can also be referred to, for instance, as a blocking or covering member 702 or blocking or covering feature, component, part, etc. 702.

The cover feature 702, or simply cover 702, can include one or more components. In FIG. 7, a single primary component, a cover or cover plate 704 is shown. Elements connected to the cover plate 704 can also be considered a part of the cover 702, such as the connection point 706 described below. As provided above, a primary purpose of the cover feature 702 is to be movable selectively from and, at least, to a position in the system 700 whereat the cover feature will block user access to electrified components.

The cover 704 can have any of a wide variety of shapes and sizes without departing from the scope of the present technology. For instance, the cover 704 in some embodiments is planar or at least includes a planar element. The cover 704 is shown by a rectangle in FIGS. 7 and 8, but with the figures being schematic, the cover is not limited to a rectangular shape. In one embodiment, the cover is shaped (e.g., custom-shaped) to have a shape corresponding to the electrical elements that it is purposed to block when moved to its blocking position.

The smart material 212, which can be the same or similar to that described in connection with FIGS. 2-5, is in the embodiment of FIGS. 7 and 8 connected to the cover feature 702. The smart material 212 is, as referenced above, connected to the cover 702 at one or more connection points 706. By the connection point(s) 706, certain motion of the smart material 212 translates to certain corresponding motion of the cover 702.

In this embodiment, the smart material 212 can be actuated in the same way it is actuated in the embodiments of FIGS. 2-5 described above. Once actuated, the smart material changes its shape such as by constricting, i.e., recovery of its pseudo-plastic deformation imposed by the biasing element 216. By this change in shape, the connection point 706 moves, thereby moving the cover 702. In the schematic example of FIGS. 7 and 8, the smart material 212 changes from it shape shown in FIG. 7 to its shape shown in FIG. 8, causing movement of the connection point 706 and linked cover 702 from their respective positions in FIG. 7 to those of FIG. 8.

The example shape change of the smart material 212 is indicated in FIG. 8 by arrows labeled by reference numeral 708. Movement of the cover 702 is indicated in FIG. 8 by arrows labeled by reference numeral 710.

The system 700, including the smart material 212, cover 702, and related parts, are configured and arranged so that the cover 702, upon being moved to its blocking position or blocking state, shown in FIG. 8, schematically, blocks or covers access to electrical parts of the system 700 that are or may be electrically charged and otherwise accessible by personnel. The electrical parts being blocked can be the electrical components 202 themselves or wires and/or other electrical constructs connected thereto. Merely by way of illustration and example, the cover 702 is shown in FIG. 8 as covering certain of the electrical wires and connectors coming from the electrical component 202. The system 200 can just as easily be arranged so that all such wires and connectors, the electrical component(s), and/or other electrically-charged or possibly charged elements are blocked by the feature 702 when the system 700 is in the blocking state.

As referenced above in connection with FIGS. 2-5, a system according to the present technology can include more than one safety mechanism. For example, a smart material 212 can be configured and connected in a system and operate to pull a security lock into an engaged position, move a cover plate 704 into a position whereat it blocks user access to electrified components, and/or keep closed a circuit draining unwanted charge—the latter (the keep-closed) function being shown generally in FIG. 14 and described below more in connection with that figure.

Operation of the system 700 of FIGS. 7 and 8 is similar to the operation of the system 200 described in connection with FIGS. 2-5 and FIG. 6. A primary distinction being that the security mechanism focused on in the system 700 of FIGS. 7 and 8 is the cover 702 compared to the security mechanism focused on in the system 200 of FIGS. 2-5 and 6 being the lock features. As provided in description of the method 600 of FIG. 6, the security mechanism described therein could be the cover 702 in addition to or instead of the lock mechanism.

FIG. 9—Third Exemplary System Unactuated

FIG. 9 shows a system 900 according to another embodiment of the present technology. The system 900 includes a triggering component 902 configured and arranged to selectively cause closure of an electrical link 904.

The electrical link 904 is connected to a power source 906. The system 900 can also include one or more electrical grounds 908, 234. The power source is in some particular embodiments a local power source, such as a battery.

A goal of the system 900 is to, at a select time, drain or relieve charge, most desirably all, from the power source 906. It will be appreciated that while in some situations it may be possible to drain or relieve all relevant charge, such as when a finite amount of unwanted charge is in the system, it may not be possible in cases in which an unwanted input charge continues, such as in a case of some mis-wiring situations.

By the present technology, the triggering component 902 would trigger closure of the electrical link 904 thereby commencing a drain procedure to drain or release the charge from the battery and preferably any other elements to which charge is at the time present.

FIGS. 10 and 13 show two alternate embodiments of the triggering component 902.

FIG. 10—First Example Triggering Component Unactuated

In FIG. 10 the triggering component 902 (FIG. 9) includes a sensor arrangement $902^1$ configured to react to certain motion or action. In one particular embodiment, the sensor arrangement $902^1$ is a ball-and-tube sensor arrangement, or other type of impact or intense-motion sensor. In this embodiment, an activating element $902^{1-1}$ such as a ball, is configured and arranged to pass a holding feature $902^{1-2}$, such as a thin film, releasable brackets, fingers, or the like, in response to sufficient force 910, such as that caused in an impact event.

FIG. 11—First Example Triggering Component Actuated

FIG. 11 shows the features of FIG. 10 after the triggering component (e.g., sensor arrangement) $902^1$ shown is activated, such as by a force 910. As shown, the activating element $902^{1-1}$ was caused by the force 910 to overcome the holding effect of the holding feature $902^{1-2}$, and continue to contact and close the electrical link 904.

FIG. 12—Second Example Triggering Component Actuated

FIG. 12 shows an embodiment in which the ball $902^{1-1}$ includes a conductive material and the system is arranged so that the ball, when falling into place, completes a circuit as shown in the figure, allowing current to flow from source 906, shown partially by dashed lines in FIG. 12, and more expressly in FIGS. 9 and 10.

In one embodiment, the ball $902^{1-1}$ includes steel or another conductive metal or conductive material. The resistor(s) 236, as in all illustrated embodiments, can be a current limiter configured to control by limiting the amount of current that can pass through the circuit branch including the SMA, thereby avoiding the SMA being exposed to too high of a current.

By completing the circuit shown in FIG. 12, including the source 906, the ball $902^{1-1}$, and the SMA 212, the SMA 212 receives current from the source 906. By this current, the SMA 212 heats by joule heating, thereby causing the SMA 212 to contract to its original configuration. The source 906 can be drained via this circuit.

It is also seen in FIG. 12 that the system can be configured and arranged to provide a second circuit flowing also from the source 906, but directly to the SMA 212, and not through the ball $902^{1-1}$. In this embodiment, the system is configured and arranged robustly wherein current has two alternate routes to travel—e.g., if one route breaks, charge in the source 906 can still drain through the SMA 212 via the other route.

In one contemplated embodiment, the system is arranged so that the ball does not physically move the closing portion 904 to its closed position (e.g., at the area indicated by reference numerals 915 in the figure; rather the system is arranged so that there is a space between the ball and the closing portion 904). Rather, the ball, by contacting the contacts 911, 913, creates the first circuit allowing the current to flow to the SMA 212, and the SMA in response contracts, thereby closing the closing portion 904.

FIG. 13—Third Example Triggering Component Unactuated

In FIG. 13, the triggering component 902 (FIG. 9) includes a relay arrangement 902$^2$, or a common signal source, configured to react to an input signal by causing closure of the electrical link 904. The relay arrangement includes a triggering component including a relay arrangement 902$^2$.

FIG. 14—Third Example Triggering Component Actuated

FIG. 14 shows the features of FIG. 13 after the triggering component 902$^2$ is activated, such as by an electrical signal or an electronic message 912. As shown, the activating element 902$^2$, in response to the signal or message 912, effects closure of the electrical link 904. In one embodiment, the relay 902$^2$ does this by causing a current to flow to the smart material 212, such as via the relay 902$^2$, or other signal source, through the line shown between the relay and the smart material 212. In a contemplated embodiment, the relay 902$^2$ causes the closure by causing a joint 914, such as a hinge, to move to close the link 904. In another contemplated embodiment, the relay effects the closure by causing movement of (e.g., by pulling or pushing) a connecting end 916 of the link 904. In some embodiments, the relay initiates connection between the power, or charge, source and the actuator (SMA), being exposed to the current, and operates as described to hold closed the connection until power is drained beyond a point of being able to provide enough current to hold the SMA in its actuated state.

FIG. 15—Third Exemplary System Actuated

FIG. 15 shows the system 900 after the triggering component 902, whatever the type (e.g., 902$^1$ or 902$^2$), has acted to close the electrical link 904. When the electrical link 904 is closed, current 920 is able to flow, from the power source 906 and/or any other charged elements connected to the link 904, through the link 904 and to the smart material 212. In response to being exposed to the current 920, the smart material 212 changes shape as described above. For instance, the smart material 212 contracts. By changing to an undeformed shape, the smart material 212 pulls on a contact piece 922 connected to the smart material 212 and the electrical link 904 thereby holding the electrical link 904 toward its already-existing closed position.

In these ways, once the system is triggered, including closing of the electrical link 904, the link 904 will stay closed by operation of the technology including the smart material 212 as charge is drained from the system, preferably all charge, from the power source and/or any other charged elements connected to the link 904, such as until the power is drained beyond a point of being able to provide enough current to hold the SMA in its actuated state.

By these operations, persons contacting parts of the system 700, are less likely to be shocked by charge that theoretically could originate from the power source 906.

The alarms 230, 232, the resistor 236, and the electric ground 234 can operate in substantially the same manner as described above in connection with other embodiments.

In one embodiment, the system 900 includes a biasing component, such as that shown expressly in FIGS. 2-4, 7, 8, 16, and 17, configured and arranged in the system to bias the closing portion 904 to an open position (e.g., the position shown in FIG. 9). As shown in those other figures, and described in connection with the various embodiments in the present disclosure, the biasing component can include a spring, for instance, such as a compression or tension spring.

In the embodiment of FIG. 15, when the current passing through the SMA 212 decreases sufficiently, such as by the source 906 being drained sufficiently as desired, the SMA 212 will cool, rendering the SMA weaker with a lower elastic modulus, thereby allowing the biasing element to overcome the force of the SMA 212 and the biasing element to thereby pull the connection 904 open. As provided above, while in some situations it may be possible to drain or relieve all relevant charge, such as when a finite amount of unwanted charge is in the system, it may not be possible in cases in which an unwanted input charge continues, such as in a case of some mis-wiring situations.

FIG. 16—Detail of Example Safety Mechanism Unactuated

FIG. 16 shows a system 1100 for actuating a safety mechanism 1102. The system 1100 can be used to protect persons from any one or more of various conditions including heat, cold, or radiation. For instance, the system can be used in conjunction with, or include, an opening such as a door of a steam tunnel, oven, or room or other structure that could separate the persons from an unwanted heat. Regarding cold, the system can be used in conjunction with, or include, an opening such as a door of a cryogenic chamber or room or other structure that could separate the persons from an unwanted low temperature. Regarding radiation, the system can be used in conjunction with, or include, an opening such as a door of a radiation container, room, or other structure that could separate the persons from unwanted exposure to radiation.

As a particular example regarding protection from unwanted heat, in an automobile or other vehicle, the system 1100 can be used to protect persons from accessing a radiator via the radiator cap, when the heat and pressure therein are above levels to which one should be directly exposed. For instance, the base part or surface 1116 shown in FIG. 16 and described below can be or be connected to a radiator cap. The figures are considered to show analogously the system 1100 for locking components like a door of a room, a door of a steam tunnel, etc.

The system 1100 includes a transformable material 1104, such as a smart material, which is in one embodiment a shape-memory alloy (SMA) such as those described herein above. In some embodiments the safety mechanism 1102 is considered a part of the system 1100, and in other embodiments it simply interacts with the system 1100.

The transformable material 1104 may be sized, shaped, and arranged in any of a wide variety of manners sufficient to actuate the safety mechanism when the material changes from a first form to a second form (e.g., contracts). In the embodiment illustrated in FIG. 16 expressly, the material 1104, e.g., SMA, is in an elongated form. Further in this embodiment, the material 1104, which can have a wire or cable geometrical form, extends between two connecting points such as the exemplary points 1106 shown in FIGS. 16 and 17. At an intermediate portion of the material 1104, the material 1104 engages a contact point 1108 of the safety mechanism 1102.

FIG. 16 is also considered to show, in combination with other figures (e.g., FIGS. 2-4 and 7-10) and corresponding descriptions, the transformable material 1104 also having an elongated form, but instead of the arrangement shown expressly in FIG. 16, an embodiment in which the transformable material 1104 pulls directly on a part (e.g., part 213 in FIG. 2, part 216 in FIG. 7, part 706 in FIG. 8, part 904 in FIG.

9) to actuate the safety mechanism 1102. Such part can be considered as a part of the safety mechanism or connected to the safety mechanism 1102.

Although in the embodiment illustrated in FIG. 16, the safety mechanism 1102 includes a locking component 1110, the figure in conjunction with the other figures (e.g., FIGS. 7 and 8) and descriptions herein is considered to also constructively show an embodiment in which the security mechanism 1102 is a cover or shield (like the shield 702 of FIGS. 7 and 8).

The locking component 1110 is connected to a biasing component 1112 configured and arranged in the system to bias the safety mechanism 1102 to a non-engaged position (shown schematically in FIG. 16). This biasing of the locking component 1110 is, in the example of FIG. 16, toward the left, as shown by the arrows 1113. In the example of FIG. 16, the biasing component 1112 is a compression spring.

The spring of this example is at a first end connected to or at least positioned to selectively engage a flange 1114 or other bias-contact part of the locking component 1110. The spring of this example is at a second end connected to or at least positioned to selectively engage a part such as a base part or surface 1116. As shown, the surface 1116 can be a part of a complementing locking part, which is in some embodiments analogous to the complementing part 218 shown in FIG. 2.

In one embodiment, the biasing component is a tension spring connected directly or indirectly to the locking component 1110, such as the spring 216 shown in the embodiment of FIG. 2.

The locking component 1110 includes an engagement portion 1120 positioned and arranged to be inserted into or otherwise engage a receiving part 1122 (like, e.g., the receptacle 220 of FIG. 2). In cases in which the base part 1116 and receiving part 1122 are parts of, or connected to, a rotating device, such as an automobile radiator cap, the engagement portion 1120 can be referred to as a detent, having the purpose of keeping the base part 1116 from moving (e.g., rotating to remove the cap).

In one embodiment, the transformable material 1104 is an SMA smart material arranged at a temporary shape shown in FIG. 16 while at a low temperature at which the SMA has a relatively low modulus. More particularly, at low temperature, the SMA 1104 can be pseudo-plastically deformed by the biasing element 1112 (or by hand), thereby moving the safety mechanism 1102 to its disengaged position shown in FIG. 16. These same concepts can apply to the transformable materials and configurations and arrangements thereof in connection with the embodiments of FIGS. 2-4 and 7-10.

FIG. 17—Detail of Example Safety Mechanism Actuated

FIG. 17 shows the system 1100 of FIG. 16 with the safety mechanism 1102 moved to its engaged state. The system 1100 is moved to this engaged state by the transformable material 1104, e.g., SMA, activating. The SMA 1104 activates, by contracting, when exposed to a sufficient stimulus.

It can be seen that, in the embodiment expressly shown in FIG. 17, because the connection points 1106 are fixed, the SMA 1104 contracting creates an actuating force 1124 against the contact point 1108 of the safety mechanism 1102 (i.e., toward the right in the schematic of FIG. 17). This force 1124 causes the safety mechanism 1102 to also move—i.e., toward the right in the schematic of FIG. 17, as shown by motion arrow 1125.

The SMA 1104 and biasing component 1112 are selected, and the relevant components including these are configured and arranged so that, when the SMA 1104 is exposed to sufficient stimulus, the force 1124 created by it is sufficient to overcome bias of the biasing element 1112 (i.e., toward the left in the schematics of FIG. 16 and FIG. 17 (see e.g., arrow 1113 in FIG. 16)).

When the safety mechanism 1102 moves toward the right in FIG. 17, the engagement portion 1120 (e.g., detent) thereof is moved to its engaged position within the receiving part 1122 (e.g., receiving part of an automobile radiator cap or other base part 1116).

The concepts of the present embodiments regarding SMA activation and results of the activation can be similarly applied in different configurations and arrangements such as by using an SMA arrangement like that shown in FIGS. 2-4. Thus, for example, an arrangement like that shown in FIGS. 2-4 could be configured and arranged to be actuated by a sufficient stimulus other than joule heating from an electric current, such as by a sufficient heat, sufficient lack of heat (e.g., cold), sufficient radiation, or the other stimuli referenced herein.

These concepts described in connection with locking can at the same time or instead be equally applied to the shielding uses described (e.g., in connection with the cover or shield 702 of FIG. 7). In this case, the shield could be a heat shield, such as a heat, fire, and/or flame resistant shield, of any needed size and shape.

When the stimulus is removed or subsides to a sufficient degree or amount, such as by a temperature in an automobile radiator (a temperature to which the SMA 1104 is exposed) cools sufficiently, the SMA cools and thereby will again adopt its low temperature, deformable state, whereby the biasing mechanism 1112 will again be able to push the safety mechanism 1102 out of its engagement—i.e., toward the state shown in FIG. 16. In this way, with the relevant temperature in a safe range, the opening associated with the base part 1116, such as a radiator cap, can be safely removed or opened by personnel.

It will be appreciated by those skilled in the art that the same concepts can be applied to scenarios in which the system 1100 is arranged to protect persons from cold, such as in a cryogenic environment. As a first primary example, the system 1100 can be configured and arranged (e.g., SMA 1104 and biasing element 1112 selection/characteristics, positioning, etc.) so that the engaging portion 1120 is engaged when the SMA is exposed to a temperature that is below a select temperature. This embodiment can operate to protect personnel from extremely low temperatures, such as those in a container or room having liquid nitrogen or other very cold agent.

In one implementation, the system 1100 is arranged so that the mechanism 1102 is disengaged in response to the temperature to which the SMA 1104 is exposed being sufficiently high (i.e., not too cold). For this case, the biasing element 1112 can be configured and arranged to bias the safety mechanism 1102 toward the engaged or disengaged state.

As a second primary example, the system 1100 can be configured and arranged (e.g., SMA 1104 and biasing element 1112 selection/characteristics, positioning, etc.) so that the engaging portion 1120 is engaged when the SMA is exposed to a radiation that is above or below a select radiation value. This embodiment can operate to protect personnel from high radiation levels, such as those in a container or in or outside of a room. For this embodiment, the SMA 1104 would be at least partially covered with a coating (e.g., sleeve, patch(es), stripe(s), etc.) of a second material configured to heat or cool in response to certain levels of radiation. For this case, the figures are considered to show such partial or full covering by the lines therein surrounding the SMA 1104 (or e.g., lines for item 212 in other figures). In operation, for instance, when the covered SMA 1104 is exposed to high radiation, the covering heats causing the SMA to contract, thereby moving the locking part, or shielding part into position. In this case, the shielding part can be a radiation shield of any needed size and shape.

In some embodiments, the system 1100 (or any of those of earlier embodiments, e.g., 200, 700) includes a manual release, shown schematically in FIG. 17 by reference numeral 1126, and considered shown similarly in connection with the other illustrated and described systems 200, 700. The release 1126 can be configured to be actuated by a special key or tool, for instance, or even a common or plain tool such as a screwdriver or other long implement used by persons, such as emergency responders (e.g., fire fighters). In one embodiment, the manual release 1126 can be activated by hand. As can be seen by the representation in FIG. 17, operation of the manual release 1126 (e.g., pushing it to the left in FIG. 17) moves the safety mechanism 1102 out of the engaged position shown in FIG. 17, toward the unengaged position shown in FIG. 16.

Figure 18:
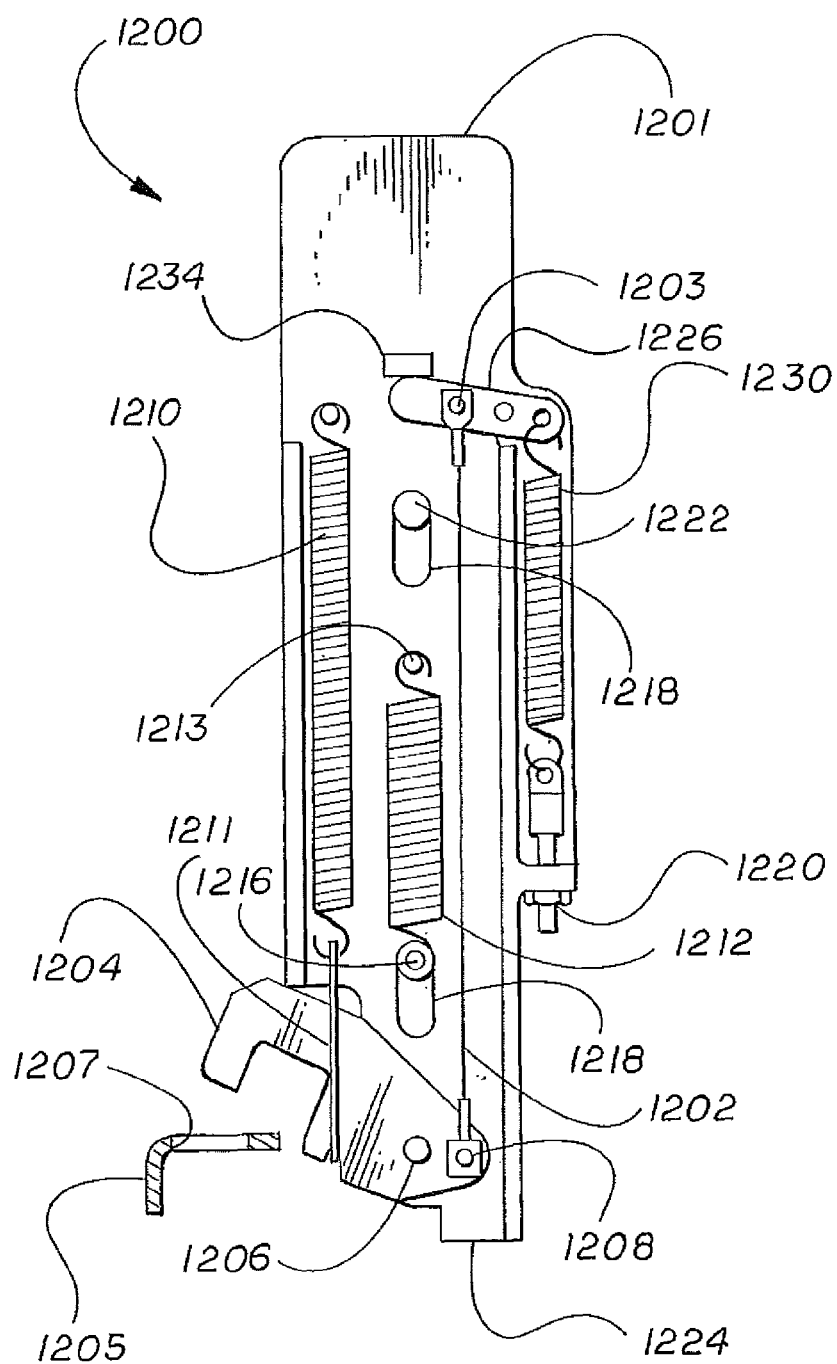
FIG. 18 shows a side view of a safety system, having a safety mechanism including a lock in an unactuated state, according to an aspect of the present technology.

FIG. 18—First Exemplary Safety System Unactuated

FIG. 18 shows a side view of a safety system 1200 according to an aspect of the present technology. The system 1200 has locking features that can be used with any of the other embodiments described herein. For instance the detailed locking mechanism showed in FIG. 18 can be used for locking aspects of the systems 200 or 1100 shown in FIGS. 2-5 and 11.

The system 1200 includes a body 1201 and at least one transformable material 1202 connected to the body 1201. The transformable material may have any one or more of the characteristics described herein in connection with transformable materials. For instance, the material 1202 is in some embodiments a smart material, and in particular embodiments a shape-memory alloy (SMA).

The material 1202 will at times be referred to here-below as an SMA 1202 for efficiency of description, as has been done above in connection with other embodiments and transformable materials, and not to limit interpretation of what the material can be or do.

The SMA 1202 can be configured and arranged to be actuated by Joule heating (reference, e.g., FIG. 2-5 or 7-10) or by another stimulus, such as other heat, lack of heat (e.g., cold), radiation, etc. (reference, e.g., FIGS. 16 and 17).

The SMA 1202, like all transformable materials described herein, is selected to have desired properties. One variable for selecting the SMA is geometric form and dimension. One form includes at least one wire or cable, and dimensional variables include length and diameter.

It has been found that wire diameter can affect performance characteristics, including (i) ability and success of the wire to act partially in place of a high-wattage resistor, (ii) by allowing use of a lower-wattage resistor—e.g., a lower wattage for a distinct associated resistor (e.g., from about 35 watts normally down to about 12 watts), (iii) increased heat dissipation, (iv) allowing increased length (e.g., to about 44 inches (1.12 meters)), (v) lower cost, (vi) improved cycle life, and (vii) lower current requirements.

Regarding the first (i) of these eight (viii) example benefits, it has been found, for instance, that a relatively thin and long wire diameter can affect performance characteristics in that a longer and thinner wire can be better connected mechanically in parallel with a wattage resister, intended to reduce total current flow and related watts, which allows a user to remove or replace the wattage resister. Due to an inverse relationship between cross-sectional area of a wire and its electrical resistance, as area decreases, electrical resistance of the wire increases.

And it has been found that wire diameter can affect performance characteristics by (ii) allowing use of a lower resistor wattage via reducing wire diameter. Using a longer wire can reduce current and watts (e.g., from about 35 watts down to about 12 watts) while performing required work.

It has also been found that wire diameter can affect performance characteristics by, e.g., (iii) using multiple relatively-small diameter wires pulling in parallel with each other, which results in increased heat dissipation. In this way, surface-to-mass ratio (i.e., wire surface area versus the mass being moved) is increased as compared to a single, larger, medium, diameter wire, thereby allowing for the increased rate of heat dissipation. The increased rate is in some cases up to about four times faster.

It has also been found that wire diameter can affect performance characteristics by (iv) increasing length by looping a longer wire back and forth between the two applicable connection points (see e.g., FIG. 21) to reflect a parallel mechanical configuration to perform similar or identical work. In one embodiment, the increased length is up to about 44 inches (1.12 meters).

It has also been found that wire diameter can affect performance characteristics by (v) lowering cost by replacing a high-wattage resister with longer wire which can cost much less.

It has also been found that wire diameter can affect performance characteristics by (vi) improving cycle life by having a smaller cross-sectional area, which allows for uniform internal stresses as the temperature of the wire is generally consistent throughout (e.g., from the core, out). A wire having a relatively-small cross-sectional area can, along with heating more rapidly, do so with less risk of overheating or contracting undesirably.

And preferred wire diameter can (vii) lower electrical current requirements in accord with established electrical principles—e.g., the power law of Watts (power)=Current$^2$×Resistance (or, $W=I^2R$). Current can be measured in amperes, and in some cases a smaller diameter wire(s) can lower electrical current requirements down to about 200 mA.

In one embodiment, a diameter of the SMA element is about 0.004 inches. In one embodiment, the diameter of the SMA element is between about 0.01 inches and 0.005 inches, and in a particular case about 0.008 inches. In one embodiment, an SMA strand is about 0.015 inches.

The particular form of the element is not limited. For instance, the element could be a wire, a strand, a cable, a braid, or a woven construct, only by way of example. While certain of these, or other, terms are used herein, all of these forms are considered disclosed as an option for each embodiment, and so the embodiments are not limited to any particular form of the element. Also, the element is not limited to a particular shape, either, and can have a shape having a cross section like a ribbon, that is oval, or that is rectangular, by way of example. In one embodiment, the element is in the shape of a helical coil, e.g., a spring.

As shown in FIG. 18, the SMA 1202 is connected to the body 1201 at a first connection point 1203 and at its second end, via a second connection point 1208, to a first, movable locking component 1204 such as a latch. As shown in other figures (e.g., FIGS. 21, 22, 25, 27), the first end 1203 in some embodiments includes a pulley device and/or other arrangement to accommodate one SMA element looped to form an effective multi-wire parallel formation, or multiple distinct elements of SMA 1202 forming such a formation. The connection point 1208 (e.g., the pulley device) is in some embodiments considered a part of the latch 1204.

The first locking component 1204 will be referred to primarily here-below as a latch 1204 for efficiency of description, and not to limit interpretation of what the part 1204 is or does.

The latch 1204 is sized, shaped, and arranged to engage selectively a second, receiving lock component 1205. The second, receiving lock component 1205 will be referred to primarily here-on as a receiving component or simply as a receiver 1205 for efficiency and not to limit interpretation of the second locking component 1205.

The latch 1204 shown explicitly in FIG. 18 moves by rotation about a pivot point 1206, such as a pivot pin or axle. The receiver 1205 includes a receptacle 1207 (e.g., hole) sized, shaped, and arranged to receive a portion of the latch 1204.

In some embodiments, the connection point 1208, like the first connection point 1203, includes a pulley device and/or an arrangement to accommodate multiple elements of SMA 1202. These aspects are shown in more detail in FIGS. 21, 22, 25, and 27.

The system 1200 includes at least one (a first) biasing element 1210. In some embodiments, such as that shown expressly in FIG. 18, the first biasing element 1210 is configured and arranged in the system 1200 to bias the latch 1204 toward an unengaged position. The first biasing element 1210 is connected at a first end (toward a top in the schematic view in FIG. 18) to a static point, such as a point on the body 1201.

At a second end of the first biasing element 1210 (toward a bottom in the view of FIG. 18), the first biasing element 1210 connects to the latch 1204. The first biasing element 1210 in some embodiments connects directly to the latch 1204 and in some embodiments connects to the latch 1204 by way of one or more intermediate components, such as the connector 1211 shown in FIG. 18.

The biasing component 1210 can be like any of the biasing components described herein. For instance, the biasing component 1210 in some embodiments includes a spring, such as a tension spring. It will be appreciated that the system 1200 can be arranged instead so that the biasing component 1210 includes a compression spring and accomplishes the same function—i.e., of biasing the latch 1204 out of engagement. In this and all embodiments, as referenced above regarding protecting persons from unwanted cold, the biasing element could bias the lock into engagement (or the shield into a covering position) so that SMA actuating results in the safety mechanism being removed (e.g., the latching lock being unlocked or the shield moved to allow access). This possible scenario and corresponding arrangements are constructively disclosed for all embodiments herein.

In the view of FIG. 18, the system 1200 is in an unactuated, or cold state. In this state, the system 1200 is unengaged and, more particularly, the latch 1204 is not engaged with the receiver 1205. When unactuated (e.g., when unheated in Joule-heating embodiments), the SMA(s) 1202 is/are in the lower-elastic-modulus, weaker, state, so that a biasing force of the biasing element 1210 overcomes the weak-state force of the SMA(s) 1202, thereby ensuring the latch 1204 is under these conditions not in engagement with the receiving part 1205.

As also shown in FIG. 18, in some embodiments, the system 1200 further includes a second biasing component 1212. The second biasing component 1212 connects, at a first end of the component 1212 (upper end of the component 1212 in the view of FIG. 18), to a mounting part 1213. The mounting part 1213 is attached to the body 1201.

A second end of the second biasing component 1212 (lower end in the schematic example of FIG. 18) connects to a lower anchor pin 1216. The second biasing component 1212 is, e.g., a biasing spring.

The second biasing component 1212 urges the pin 1216 upward against or at least toward a top of the slotted holes 1218.

The lower anchor pin 1216 and an upper anchor pin 1222 are both affixed to the breaker or control box 100. The pins are limited to vertical movement within the confines of the slotted holes 1218 in the body 1201.

The second biasing component 1212 and associated anchor pins 1216, 1222 are part of a manual release feature. These features and the manual-bypass feature are explained in more detail below, including in connection with FIG. 20.

A third biasing component 1230 is described further below, primarily in connection within FIGS. 21 and 25.

Figure 19:
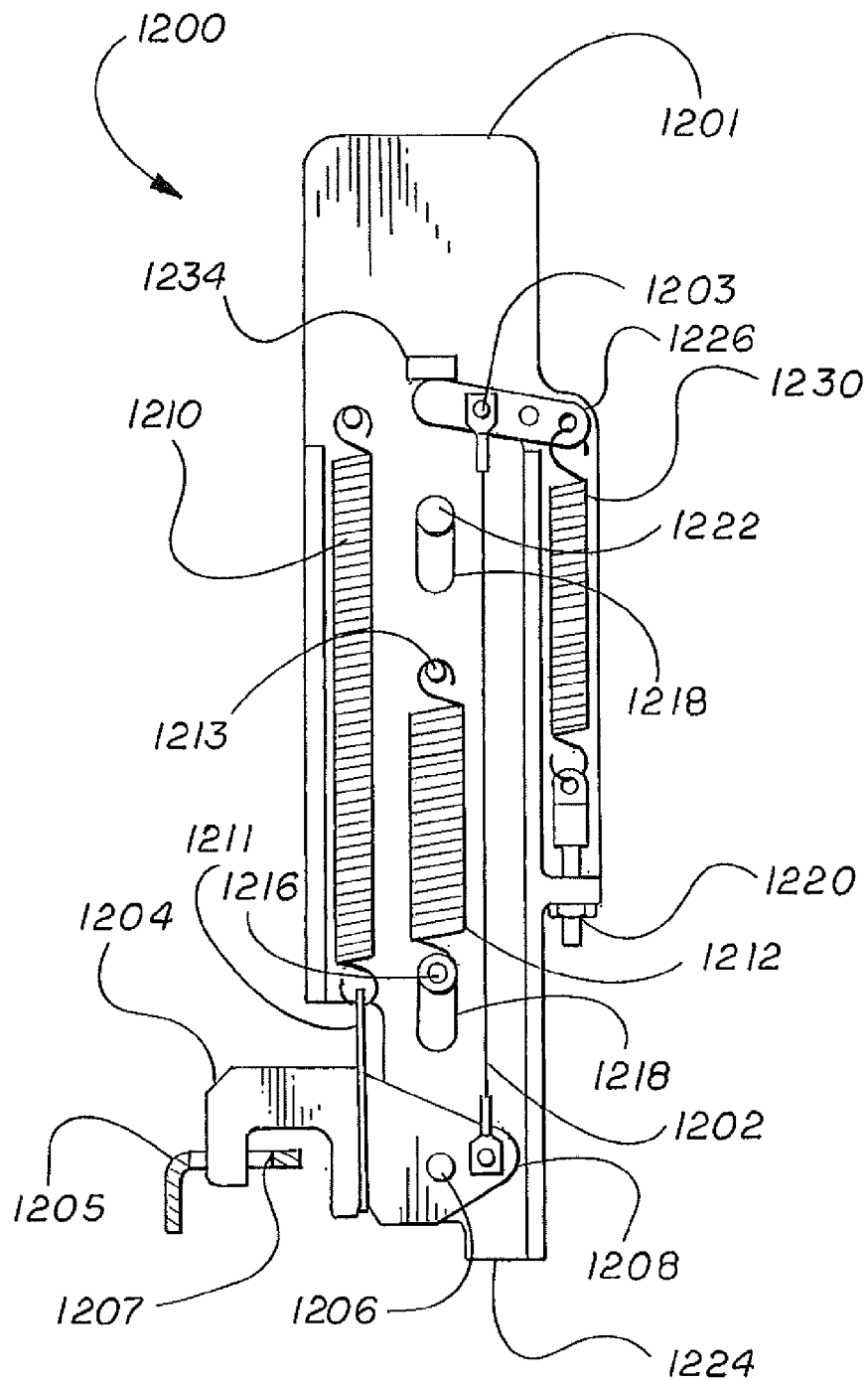
FIG. 19 shows the side view of the system of FIG. 18, with the safety mechanism activated.

FIG. 19—First Exemplary Safety System Actuated

FIG. 19 shows a side view of the safety system 1200 of FIG. 18 with the SMA 1202, and so the locking safety mechanism, in an activated condition or state. To get to this state, wherein the system 1200 is engaged and, more particularly, the latch 1204 is engaged with the receiving part 1205 (including a receptacle 1207 sized, shaped, and arranged to receive a portion of the latch 1204), the SMA(s) 1202 is/are generally in their higher-elastic-modulus, stronger, state.

Therein, the SMA 1202 works to return to its original shape, by contracting (i.e., to its unstretched length, per the shape memory described above), and overcomes the force of the biasing element 1210. In other words, the heated SMA 1202 works to recover to its original state, and so its original shape.

When the SMA 1202 is heated to its higher elastic modulus, and thereby contracts, the SMA 1202 causes the latch 1204 to engage the receiving part 1205/1207, as shown in FIG. 19.

FIG. 20—First Exemplary Safety System Unactuated by Manual Release

As referenced above, in some embodiments of the present technology, the system 1200 includes a manual release (or manual override or manual bypass) allowing a person to manually disengage the locking features (e.g., latch 1204 and receiver 1205) while the SMA is still in its activated, or hot, state. An example manual release device is shown in the side view of the system 1200 shown in FIGS. 18-20.

In the event that immediate access to a breaker or control box 100 is necessary while the mechanical safety system 1200 is engaged, the manual-bypass feature can be accessed and actuated to release the lock.

In one embodiment, the anchor pins 1216, 1222 are connected directly or indirectly together, e.g., rigidly, and/or to a relatively stationary structure (e.g., a ground, wall, or table). The system is configured so that a portion of the body 1201, or a part connected generally rigidly to the body, is accessible, directly or in directly, by a user of the system, such as via a hole in the box 200 in FIG. 5 (not shown in detail). The portion of the be 1201, or the part connected thereto, can include or be connected to, e.g., a slide, button, or other mechanism by which the user can move push the body 1201 to slide upward using the slots 1218. In one embodiment, the slots 1218 are generally central to the body 1201. And in one embodiment the access feature is provided at a lower portion of the view in FIG. 18, so that a result of the user override input is upward on the body 1201, such as at about 1224.

FIG. 19 shows the system prior to the upward slide to manual override the locking action, and FIG. 20 shows the system after the manual-overriding upward slide.

Depending on the arrangement, the user (e.g., factory or plant employee or emergency responder) can actuate the bypass feature, such as via a pre-drilled hole in the box (not shown in detail), by hand, by a special tool such as a key, or by a common tool such as a screw driver or other (e.g., elongate) implement, like as a push rod.

Moving the body 1201 upward releases the latch 1204 from the latch plate 1205, by moving the latch upward, from the position in FIG. 19 to its position shown in FIG. 20, allowing opening or accessing of or through the door or whatever structure the latch 1204 was previously protecting.

Thus, the entire system 1200 can be moved up manually, such as by pressing a button (not shown in detail), or inserting a rod or other key or instrument for example, through an access hole (not shown in detail) in, e.g., the bottom of the box 200 (FIG. 5), to disengage the safety latch 1204 from the receiver 1205. The button or access hole could in one embodiment be located in line with the pad 1224 on the bottom of the body 1201.

FIG. 20 shows the system 1200 of FIG. 18 following operation of such a manual release. In response to the release action, the system 1200, or at least the latch 1204, moves to a non-engaged state in which the latch 1204 is moved out of a locking position (FIG. 19) to an unlocked position, as shown in FIG. 20 (or, in some embodiments, from the position it has in FIG. 19 to the position in FIG. 18).

When the tool (rod, finger, etc.) is removed, the second biasing component 1212 pulls the pin 1216 upward in its slot 1218, and thereby pulls the mechanism back into the operating position shown in FIG. 19 (or FIG. 18 if the SMA is also unactuated), which act can be referred to as a reset function. Thus, the second biasing component 1212 holds the safety system 1200 in its normal operating position, or returns it to its normal operating position, after removal of the force applied via the user hand, rod, key, or other instrument used to manually bypass the safety system 1200.

FIG. 21—Second Exemplary Safety System Unactuated

FIG. 21 shows a perspective view of a system 1400 like the system 1200 of FIG. 18. A difference between the systems 1200, 1400 is that the system 1400 of FIG. 21 includes, at a lower connection point for the SMA, a lower pulley device 1208, or other mechanism for accommodating multiple SMA, or a single SMA that is looped about the lower pulley device and a corresponding upper pulley device 1203.

The system 1400 is shown in an unactuated state, like the state of the system 1200 of FIG. 18.

As shown, the system 1200 can include, adjacent a first end of the SMA 1202 (e.g., adjacent a top end of the SMA in the schematic of FIGS. 18 and 20), a support lever 1214, which can also be referred to as a work arm.

In some such embodiments, ring terminals at respective wire ends are isolated from each other using washers, such as nylon washers held in place by welds, screws, etc.

The support lever 1214, or work arm, can include or be connected to a support or overload protection arm 1226. In one embodiment, at least one function of the work arm 1214 is to provide additional support for a pulley feature (e.g., item 1203) positioned between the work arm 1214 and the overload protection arm 1226. In some embodiments, both ends of every SMA 1202 in the system 1200 are connected to at least one of the pulley, the work arm 1214, and the overload protection arm 1226.

The support or overload protection arm 1226 is in turn connected to a third biasing component 1230. As with the other biasing components described herein, the third biasing component 1230 can have any of a wide variety of forms (e.g., sizes, shapes, materials).

For instance, the third biasing component 1230, which can be referred to as an "overload spring," in some embodiments includes a spring, such as a tension spring. And it will be appreciated that the system 1200 can be arranged so that the biasing component 1230 includes a compression spring and accomplishes the same function—i.e., of biasing an overload protection feature. The biasing component 1230 is part of an adjustable overload protection component explained in more detail below.

In the embodiment of FIG. 21, the first connection point 1203 is located between the work arm 1214 and overload protection arm 1226. As provided above, and shown in FIG. 21, the first connection point 1203 in some embodiments includes a pulley device configured and arranged to accommodate multiple elements of the SMA 1202.

As also provided above, and as shown in FIG. 21, the system 1200 in some embodiments also includes, like the first connection point 1203, a pulley device or other arrangement to accommodate multiple elements of SMA 1202.

FIG. 21 also shows an overload link or pin 1227, which can also be referred to as a pivot point. The overload pin 1227, which is shown positioned in a slot 1228 of the body 1201, connects the overload protection arm 1226 to a work arm 1214.

FIG. 21 shows the mounting part 1213 referenced above, e.g., in connection with the second biasing element 1212. As provided, the second biasing component 1212 connects at its first end (upper end in the views) to the mounting part 1213. The mounting part 1213 is described further below in relation to the system 1600 of FIG. 27 and the shield that can be connected to the part 1213.

FIG. 21 also shows parts of an overload adjustment bolt 1220. The overload adjustment bolt 1220 allows adjustment of tension on an overload protection portion of the system, which protects the SMA wire 1202. The adjustment sets the range of loads at which the overload protection is triggered. In the event the latch 1204 gets blocked or hung up when in operation, the SMA 1202 could be overstressed and damaged as it attempts to contract to its original length. An overload protection feature is incorporated to prevent such an occurrence. The upper end of the third biasing component 1230 is attached to one end of the overload protection arm 1226. The other end of the overload protection arm 1226 contacts (e.g., rests against) an overload stop 1234 on the body 1201. A lower end of the third biasing component 1230 is attached to the adjustment bolt 1220. The adjustment bolt 1220 passes through a clearance hole 1229 in the body 1201. An adjusting nut 1232 (shown in FIG. 20) is threaded onto an end of the adjustment bolt 1220 and seats against the body 1201.

A tension force in the third biasing component 1230 is controlled by rotating the adjusting nut 1232, thus changing a length of, and a tension in, the third biasing component 1230. In one embodiment, the tension should be set just high enough to prevent the end of the overload protection arm 1226 in contact with the overload stop 1234 from moving off the overload stop 1234 when the SMA 1202 contracts and the latch 1204 freely engages the receiver 1205. If the latch 1204 fails to freely move through its full range of motion due to an obstruction or interference with the receiver 1205, the contraction force generated in the SMA 1202 will increase until it exceeds the tension force in the third biasing component 1230, thereby pulling the overload protection arm 1226 off the overload stop 1234. The overload protection arm 1226 pivots about the overload pin 1227 and stretches the third biasing component 1230 instead of overstressing the SMA 1202.

Also in FIG. 21, reference numeral 1240 indicates a current limiting or load resistor. The resistor is also identified by R1 or R2 at times below in the descriptions of FIGS. 30-38, and shown in the figures by various reference numerals, such as numerals 1804, 1904, 1906, 2004, etc.

FIG. 22—Lower Portion of Second System Unactuated

FIG. 22 shows a close-up perspective view of a lower portion of the system 1400 shown in FIG. 21. As provided, directional indicators used in the present disclosure, e.g., lower, upper, up, down, right, left, are used herein for efficiency of description in connection with the illustrated embodiments, and not necessarily to limit embodiments of the present technology. For instance, the portion of the system 1400 shown in FIG. 22, though referred to above in this paragraph as a lower portion, need not actually be in a lower position with respect to other components of the system when the system is in operation.

Particularly, FIG. 22 shows, in more detail, the latch 1204, the receiving component or receiver 1205, including the receptacle 1207 sized, shaped, and arranged to receive a portion of the latch 1204. FIG. 22 also shows, in more detail, the lower, second, connection point 1208 including the pulley device to accommodate multiple elements of SMA, or one SMA element looped about the pulley devices 1203, 1208 (the SMA not shown in FIG. 22 for clarity).

FIG. 22 also shows, in more detail, a bottom part of the first biasing element 1210, the intermediate connector 1211, and a lower part of the second biasing element 1212.

As with FIG. 21, FIG. 22 shows the components of the system 1200 being in an unactuated state, like FIG. 18.

FIG. 23—Lower Portion of First System Unactuated

FIG. 23 shows a close-up perspective view of a lower portion of the system 1400 of FIGS. 21 and 22.

As provided, a primary distinction between the components shown in FIG. 23 and those of FIG. 22 is that a single strand of SMA 1202 is shown and the lower connection point 1208, in relation to the single strand, does not include a multi-strand pulley device.

As with FIGS. 18, 21 and 22, FIG. 23 shows the components of the system being in an unactuated state.

Figure 24:
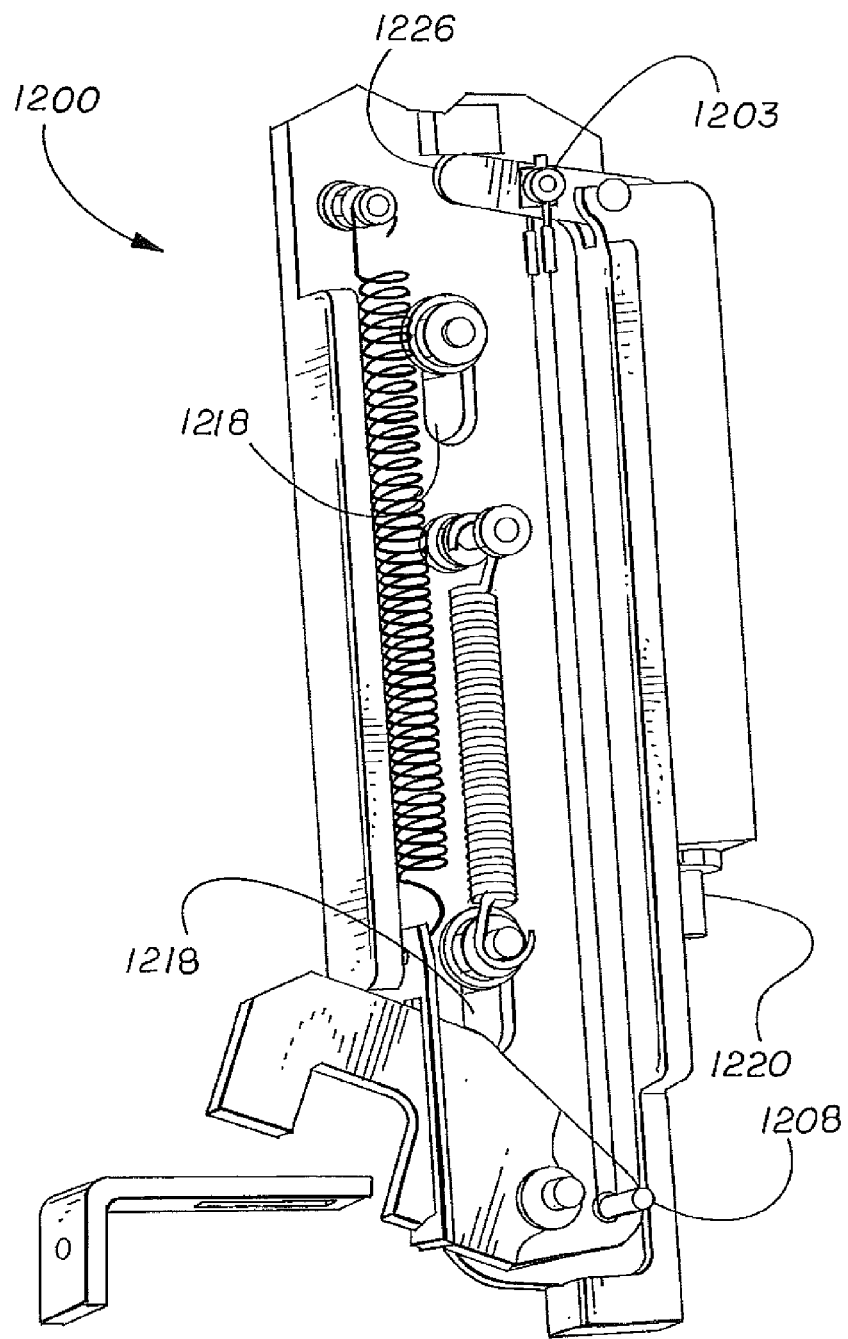
FIG. 24 shows a partial side-view of the system of FIG. 23.

FIG. 24—Perspective of the First Safety System

FIG. 24 shows a partial side-view of the system 1200 of FIG. 23.

As shown, the upper connection point 1203 of this embodiment (like the lower point 1208 of FIGS. 18-29 and 23) does not include a pulley mechanism, and accommodates a single strand of SMA 1202—e.g., a single strand connected at both of its ends to a top connecting point 1203 and down to the lower connecting point 1208.

FIG. 25—Upper Overload Protection Features of Second System

FIG. 25 shows a close-up perspective view of an upper portion of the system 1400 shown in FIG. 21. Particularly, FIG. 25 shows, in more detail, the upper connection point 1203 including the pulley device to accommodate multiple elements of SMA 1202 or a single SMA element looped multiple times about the connection points 1203, 1208 (SMA not shown in FIG. 25).

FIG. 25 also shows an upper part of the third biasing element 1230, and the work arm 1214 and the support or overload protection arm 1226 connected to the pulley device of the upper connection point 1203.

FIG. 26—Upper Overload Protection Features of First System

FIG. 26 shows a close-up perspective view of an upper system portion, like that of FIG. 25, but for the system 1200.

In some embodiments of this system 1200, corresponding to the single strand and lack of a multi-strand pulley device, the support part 1214 is not used. In FIG. 26, by way of example, only the support or overload protection arm 1226 is shown.

Figure 27:
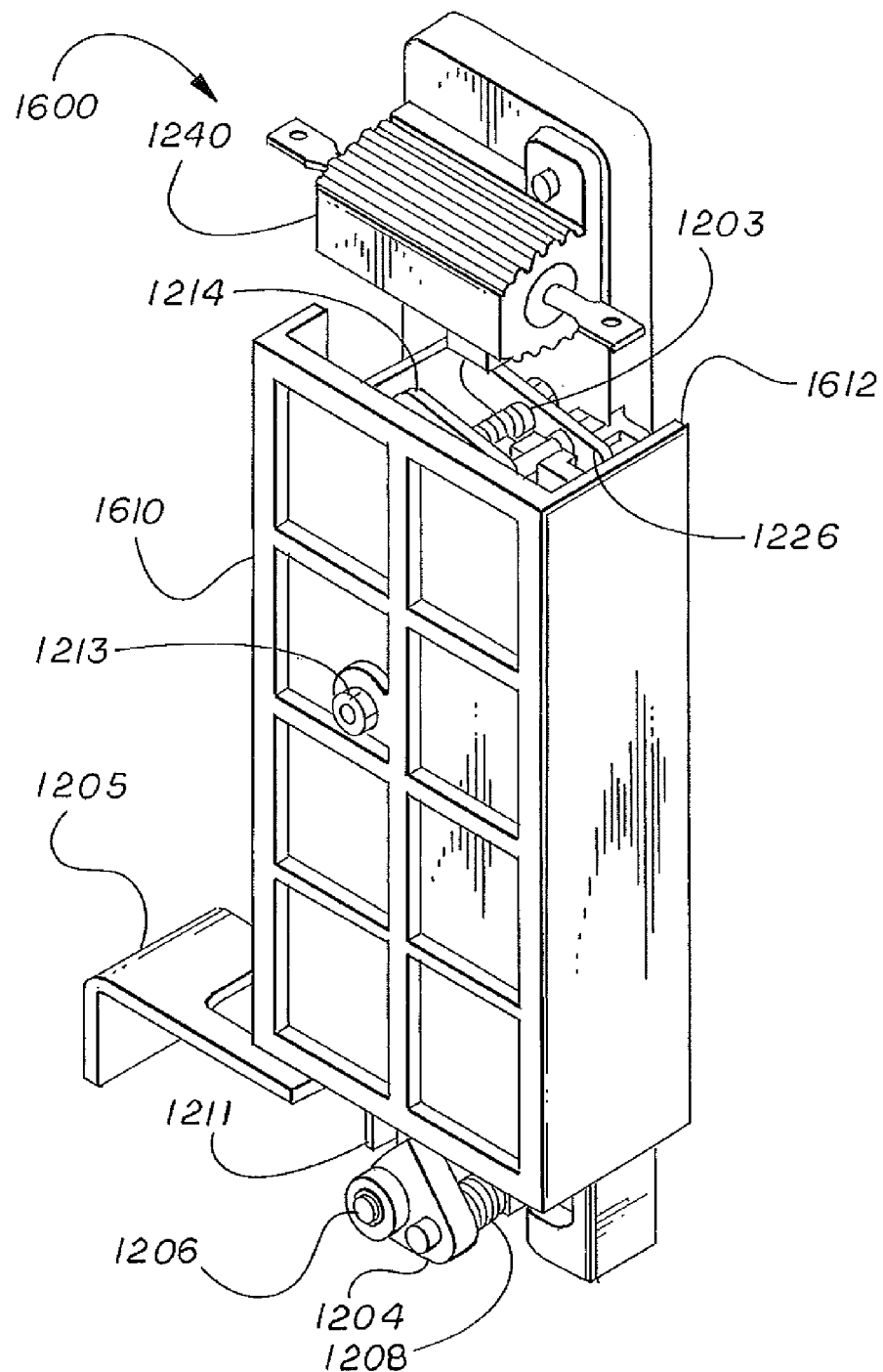
FIG. 27 shows a system according to another embodiment of the present technology.

FIG. 27—Third Exemplary Safety System

FIG. 27 shows a system 1600 according to another embodiment of the present technology. In a particular embodiment, the system 1600 includes many of the same components and functions described above in connection with the other systems, e.g., systems 1200, 1400.

Components of the system 1600 of FIG. 27 that can be, but need not be, the same or similar to corresponding components of the system 1200, 1400 are identified in FIG. 27 by the same reference numerals used above in connection with those systems 1200, 1400.

The transformable material (e.g., SMA) 1202 is not shown in FIG. 27, for added clarity of illustration, and is considered to be shown constructively in FIG. 27.

The system 1600 can be configured to accommodate a multi-strand SMA, as can be seen for instance in the multi-strand pulleys 1203, 1208 shown in FIG. 27. In an alternate embodiment, the system 1600 includes the single strand SMA components.

A primary distinction between the systems 1200, 1400 of FIGS. 18-26 and the system 1600 of FIG. 27 is that the system 1600 of FIG. 27 includes a shield or cover 1610. The shield 1610 can have any of the characteristics described herein in connection with the shields or covers of other embodiments, including size, shape, and make-up.

The shield 1610 may, e.g., include any one or more of a variety of materials without departing from the scope of the present technology. In one embodiment, the shield 1610 includes acetal (e.g., a compound having acetal resin). Other features, such as the body 1201 and the latch 1204, of the systems described herein (e.g., systems 200, 700, 900, 1100, 1200, 1600) can include the same material.

These and other components can also, or instead, include a metal or metal alloy, such as steel—e.g., mild or tool steel. In some embodiments, particular materials are preferred. For instance, in one embodiment, it is preferred that material of any shield (e.g., shield 1610 in FIG. 27) include a non-metallic and/or non-electrically conductive material.

The shield 1610 can also be, e.g., fire-resistant, heat-resistant, radiation-resistant, the like, and/or etc. The shield 1610 is in one embodiment used simply to block physical access by persons to undesired areas, such as areas having electrical components carrying an unwanted charge.

As shown in FIG. 27, the shield 1610 can have one or more flanges, splines, or spines 1612. The example of this figure shows three spines 1612: a right-most spine, an intermediate spine, between a right and a left side of the shield, and a left-most spine. The spines 1612 can have any of a wide variety of shapes and sizes without departing from the scope of the present invention. As an example, the left-most spine 1612 in FIG. 27 has a smaller size than the other two spines in the figure.

One benefit of spines 1612 is that they cover components from lateral exposure or access (i.e., from the side in the view of FIG. 27). Regarding the intermediate spine, the spine can also operate to separate/isolate parts of the system 1600 positioned on opposite sides of the intermediate spine.

FIG. 27 also shows the mounting part 1213, which is referenced above, e.g., in connection with FIGS. 18 and 21. Particularly, the mounting part 1213 is described mostly in relation to the second biasing element 1212 (e.g., tension spring). As provided, the second biasing component 1212 can connect at its first end (upper end in the views provided) to the mounting part 1213.

In some embodiments of the system 1600, the shield 1610 connects to the same mounting part 1213, which would in these cases be movable, such as in response to operation of the SMA. In some embodiments, part 1213 is not static and is attached to part 1224, e.g., which can, as provided, can be moved, such as by manual override.

FIG. 28—Lower Portion of Third System Showing Overload Feature

FIG. 28 shows a close-up perspective view of a lower portion of the system 1600 shown in FIG. 27. FIG. 28 shows the components of the system 1600 in an actuated, locked state.

Particularly, FIG. 28 shows, in more detail, the latch 1204, the receiving component (or receiver) 1205 sized, shaped, and arranged to receive a portion of the latch 1204, and the connector 1211 connected to the latch. FIG. 28 also shows, in more detail, a bottom part of the shield 1610.

FIG. 28 also shows a hot cutoff switch 1620. As shown, the hot cutoff switch 1620 includes an extended portion 1622. The system 1600 also includes a protrusion 1624 extending from the lower connection point 1208, or directly adjacent the lower connection point 1208.

As shown, the extended portion 1622 of the hot cutoff switch 1620 is configured and arranged to extend to the protrusion 1624. In operation, the hot cutoff switch 1620 is configured and arranged in the system 1600 to turn off input (e.g., power) to the SMA 1202 in response to a certain amount of SMA activation, e.g., the length is less than a predetermined threshold length, and to allow the input (e.g., power) to again flow to the SMA 1202 again once the wire cools and its length moves beyond the threshold length.

The switch 1620 is configured and arranged (e.g., mounted) to be engaged in response to the latch 1204 moving past a fully-deployed position for the latch 1204. When engaged, the switch 1620 opens a connection between the SMA 1202 wire and the system being protected, allowing the SMA 1202 to cool.

Selective cutoff of stimulation/input to the SMA 1202, while ensuring continuous latching, when latching is needed, preserves the SMA by using force of the SMA less, thereby preventing excessive heating, and lengthening life of the SMA.

FIG. 29—Blade-Style Contact Switch Assembly

FIG. 29 shows parts of a blade-style contact switch assembly 1700 developed for use with the systems described herein, e.g., those shown in FIGS. 18-28. The assembly 1700 in some embodiments can correspond to switching components shown in FIGS. 2-4, such as any of parts 206, 208, 209, and 210, as described more below.

The blade-style contact switch 1700 includes a body or housing 1702. In one embodiment, the housing 1702 is or includes a non-conductive housing.

In one embodiment, the housing 1702 comprises one or more first electrical contact(s) (which can be referred to as a lock portion, and which are not shown expressly in FIG. 29), connects to a main power switch (e.g., main power switch 112 of FIGS. 2-5, etc.) when they are connected. The first electrical contacts can correspond to contact(s) $209^1$ shown in FIGS. 2-4.

In one embodiment, one or more blade(s) 1708 of the assembly 1700 are connected to the electrical component (e.g., 202, aforementioned). The blade(s) 1708 can be analogous to, e.g., one or both of the switch components 208/210 in FIG. 2.

The first electrical contact(s), which as mentioned can correspond to $209^1$ in FIGS. 2-4, are connected to the main power source, e.g., source 104.

The assembly 1700 also includes one or more second electrical contacts 1710, which can correspond to $209^2$.

The second electrical contact(s) 1710, which can correspond to $209^2$, as mentioned, are connected to the transformable material (e.g., 212).

In operation, in one embodiment, as the main power switch (e.g., 112) is switched to de-power the system, the blades 1708 are moved from the first electrical contact(s) (e.g., $209^1$) of the assembly 1700 to disconnect the blades from the main power feed (e.g., 104; not shown in FIG. 29) and to connect to the secondary electrical contacts 1710 (e.g., $209^2$). In this way, if there is any unwanted electrical current in the electrical component (e.g., 202), the current will flow, through the blades 1708 and the second electrical contact(s) 1710, to the transformable material. The transformable material will, in response to such stimulus, transform, thereby actuating the safety features (e.g., lock and/or shield) described herein.

In operation, the assembly, and the contact blades 1708, have a first, or on position or mode in which the main power switch (e.g., 112) is turned on and the blades 1708 are, responsively, connected to the first electrical contacts (again, not shown in detail; but like $209^1$ of FIGS. 2-4). The assembly, and the contact blades 1708, also 1213 is not static as it is attached to part 1224 which part can be moved by the manual override if in no other way have a second, or off position or mode in which the main power switch (e.g., 112) is turned off and the blades 1708 are, responsively, moved to contact the second electrical contact(s) 1710. The assembly 1700, and contact blades 1708 thereof, are in FIG. 29 shown in the off position.

Describing this arrangement further, with further reference to FIG. 2, when the switch 112 is turned on, and so the assembly and the contact blades 1708, which, again, can be analogous, e.g., to items 208/210 in FIG. 2, are in the on position, the blades 1708 are connected to the first electrical contacts e.g., $209^1$) and so current 209 flows from the power input 104 to the system component 202. In this mode, the second electrical switch 1710 (e.g., $209^2$ in FIG. 2) is disengaged from the transformable material 212. With further reference to FIG. 3, when the switch 112 is turned off, and so the assembly and contact blades 1708 thereof are in the off position, current flow 209 from the power input 104 to the system component 202 is disconnected. In this off state, the blade 1708 (e.g., 210 in FIG. 2) is connected to the transformable material 212. As shown in FIG. 3, any unwanted charge 219 remaining in the system component 202 flows through the second electrical contact $209^2$ and the transformable material 212, which, in response to receiving current from the electrical component 200, actuates the associated security mechanism—for instance, toward the state shown in the example of FIG. 4.

Additional Electrical Control Solutions

The present technology includes various strategies for lowering voltage to an ideal level for the SMA, such as Flexinol® (FLEXINOL is a registered trademark of Dynalloy, Inc., of Tustin, Calif.). The present technology also includes various strategies for actuating the SMA element whether eventual voltage input to the SMA is 100% of that expected, less, or much less such as 50% of that expected.

The ability to actuate the SMA when the voltage is much less than expected (e.g., much less than a labeled voltage (e.g., a system's normal operating voltage)) could be needed, for instance, in situations in which one leg of a circuit is mis-wired from another circuit and, as a result, the effective voltage measures much less, e.g., half of an expected voltage.

The lock is configured to work over a voltage range, which range is dependent upon the particular control circuit and application being used (such as the control circuits shown in FIGS. 30-38).

The selected circuit configuration of the options described herein, especially below, could also impact a range of voltages that can be used, e.g., minimum or lower voltages, or a lower range that can be used. As an example, in one embodiment a widest range would allow use of a voltage source providing power all the way down to about 0.7 volts, AC or DC.

All of the discussed and/or illustrated electrical configurations described can be included in any of the systems described in this disclosure (e.g., systems 200, 700, 900, 1100, 1200, 1400, 1600), and particularly can be a part of a drain path thereof.

As described above, the drain path or drain portion of a system is that portion having amongst its functions draining or discharging unwanted charge—e.g., any residual charge left when a main power is disconnected. The drain paths illustrated and described above include SMAs, resistors, alarms, and electrical grounds.

All configurations can optionally have an additional output to a monitoring device, such as an RF (radio-frequency) transmitter to a monitoring system. Monitoring systems are described further above.

The example circuits shown in the following figures are shown as DC circuits by way of example and not limitation. It will be appreciated that other power bases (e.g., AC or 3-phase circuits) can be used. The illustrated circuits include, whether shown expressly, a positive voltage (or input), or V+, and an electrical ground, −/GND.

It will be appreciated that for an AC circuit, one could replace the V+ with a Hot 1 (H1) and the −/GND with neutral.

It will be appreciated that for a 3-phase circuit, one could replace V+ with either a Hot 1 (H1) or Hot 2 (H2) and −/GND with neutral.

Any of the circuit arrangements disclosed herein, e.g., below, can have either:
a constant-on version; or
an actuate-and-hold version.

A constant-on system would come on from a time that power is turned on and could be used to replace an existing mechanical locking switch.

An actuate-and-hold system, according to one embodiment, would in operation come on when the main power is turned off, or if commanded by a control/monitoring system, and is used as a secondary back up.

FIGS. 30-38 show circuits that can be implemented in any of the aforementioned systems. Each circuit would be connected to an input feed, such as a power feed. In alternative embodiments, the input signal could be a commanded signal, such as from a control or monitoring system.

FIG. 30—Simple Resistor Arrangement

FIG. 30 shows a circuit 1800 including a current-limiting resistor 1804 (or R1) being linked to an input charge 1802 (e.g., V+) and in series with the transformable material 1806 (e.g., SMA) and an electrical ground 1808.

A designer can select the resistor 1804 (R1) based on variables including a voltage normally present on the line and a speed of SMA actuation desired. Generally, for the design of FIG. 30, when there is a residual charge on the line, the SMA will actuate relatively fast. The SMA will release (e.g., expand to its stretched, temporary, state/shape) in response to the input charge/current dropping below a level required to hold the SMA actuated and the biasing element pulls/biases the SMA toward that stretched or temporary state.

In one embodiment, it is preferred to use the arrangement 1800 with a mechanical catch so that a hold current would not be needed. Instead, once the SMA actuates to activate a safety mechanism (e.g., a lock, a shield, and/or a circuit to be closed for closure), the mechanical catch operates to hold the safety mechanism in the activated condition. In this case, the SMA need not hold the safety mechanism in the activated condition after the SMA initially activates the mechanism.

FIG. 31—Resistor-Voltage-Divider Arrangement

FIG. 31 shows a circuit 1900 including a transformable material 1908 (e.g., SMA) divided from an input charge 1902 (e.g., V+) by a first resistor 1904 (R1) and a second resister 1906 (R2). The arrangement can be referred to as a resistive-voltage-divider arrangement.

A benefit of this strategy is that it is relatively simple. However, this arrangement results in high power dissipation (e.g., about 300 W). Also, in some cases, this strategy is relatively expensive, and only a single voltage can be accommodated.

This arrangement could still work over a range of voltages. The voltage range could vary depending on the wattage and resistance values of the resistors and dimensions of the cross section of the SMA element (e.g., diameter) of the SMA wire(s) being used.

This circuit 1900 uses the first resistor 1904 (R1) as both a current limiter and part of the voltage divider, thereby allowing better control than arrangements accommodating a full power load.

Other divided-voltage options include the following: capacitor-voltage divider (replacing R1 and R2 in FIG. 31 with C1 and C2), diode-voltage divider (replacing R1 and R2 in FIG. 31 with D1 and D2), and combinations such as a resistor/capacitor-voltage divider (e.g., replacing R2 (or R1) in FIG. 31 with C1) or a resistor/diode voltage divider (e.g., replacing R2 (or R1) in FIG. 31 with D1). FIG. 31 is considered to show any of these and such arrangements by the illustration and this description.

Regarding a capacitor voltage divider arrangement, such as an AC (alternating current) voltage divider, benefits of use include that the circuit is relatively inexpensive and is accompanied by relatively-low dissipation of power. In some embodiments, though, this arrangement works generally with only a single voltage. In some embodiments, the arrangement works generally with only a single voltage only above a specifiable voltage.

FIG. 32—Diode-in-Series Arrangement

FIG. 32 shows a circuit 2000 connected to or including an input charge an input charge 2002 (e.g., V+). The circuit 2000 has a diode 2006 (D1) in series between a resistor 2004 (R1) and the transformable material 2008 (e.g., SMA). This arrangement can be referred to simply as a diode-in-series.

AC circuits with a diode-in-series will allow only current to flow during half the cycle. AC circuits with a diode-in-parallel will control only the voltage applied to the SMA during half of the cycle.

The embodiment of FIG. 32 also shows, by light-indicating lines, that the diode 2006 can be a light-emitting diode (LED). In some embodiments, the diode is replaced by a light element such as an incandescent bulb.

FIG. 33—Diode-in-Parallel Arrangement

FIG. 33 shows a circuit 2100 connected to or including an input charge 2102 (e.g., V+). The circuit 2100 has a resistor 2104 (R1), a transformable material 2108 (e.g., SMA), a diode 2106 (D1), and an electrical ground 2110. As shown, the SMA is in parallel with the diode 2106 (D1). This arrangement can be referred to simply as a diode-in-parallel arrangement.

In the embodiment of FIG. 33, the diode, like all diodes described herein, can be a light-emitting diode (LED).

This arrangement allows control of a voltage across the SMA 2108, knowing that the voltage will be equal to a drop across the diode 2106 (D1). The current will be different but the voltage will be the same.

FIG. 34—Diode/Resistor-in-Parallel Arrangement

FIG. 34 shows a circuit 2200 connected to or including an input charge 2202 (V+). The circuit 2200 has a first resistor 2204 (R1), a transformable material 2208 (e.g., SMA), a diode 2206 (D1), a second resistor 2210 (R2), and an electrical ground 2212. As shown, the transformable material 2208 (e.g., SMA) is in parallel with the combination of components, being in series, of (i) the diode 2206 (D1) and (II) the second resistor 2210 (R2). This arrangement can be referred to as a diode/resistor-in-parallel arrangement.

As indicated in the figure, and above regarding all diodes, in the embodiment of FIG. 34, the diode 2206 can be a light-emitting diode (LED).

Because diodes, such as LEDs, require different voltages to operate, instead of a relatively-small voltage drop (e.g., a 0.7 volt drop), the drop may be relatively-larger (e.g., 1.3 volt drop). By changing the diodes/LEDs, the applied voltage to the SMA can be controlled.

In one embodiment, the second resistor (R2) and the diode (D1) are combined, such as by the resistor (R2) being built into a body of the diode (D1).

FIG. 35—PTC-in-Series Arrangement

FIG. 35 shows a circuit 2300 having a positive temperature coefficient (PTC) switch 2302, or similar switch, in series with the transformable material 2304 (e.g., SMA). The circuit 2300 also includes or is connected to an electrical ground 2306. PTC switches are also known as poly switches or poly fuses. The arrangement of FIG. 35 can be referred to as a poly-switch-in-series arrangement, or a poly-fuse-in-series arrangement.

Generally, poly switches provide protection from over-temperature (i.e., over heating). The switch heats up relatively quickly in response to increases in current and, as it heats up, its resistance increases, such as non-linearly with increase in current/heat increase. In this way, the poly switch guards a protected downstream component (i.e., the SMA in this case) from high charge such as in connection with a power or current surge.

In some embodiments, the poly switch acts like a small resistor until, through Joule heating, it reaches a set temperature, at which point the switch changes to a higher (e.g., very-high) resistance until cooled via a marked decrease (e.g., elimination) of input current.

In operation, the current required for activation (i.e., for the SMA to activate the safety mechanism(s)) can be different than the hold current (i.e., current required for the SMA to hold the mechanism(s) in the activated state). At a given voltage, it takes more current to activate the SMA actuator than it does to maintain it in an activated/engaged state.

FIG. 36—Breaker-in-Series Arrangement

FIG. 36 shows a circuit 2400 having an electrical breaker 2402 in series with a transformable material 2404 (e.g., SMA) and a resistor 2406 (R1). The breaker is in some embodiments a bi-metal, self-resetting, breaker. The circuit 2300 also includes or is connected to an electrical ground 2408.

In operation, the electrical breaker acts, roughly, as a pulse-width modular (PWM), or pulse-duration modulator (PDM). Generally, the breaker, like PWMs, functions to control power passing through it and, in this case, on to the SMA.

Figure 38:
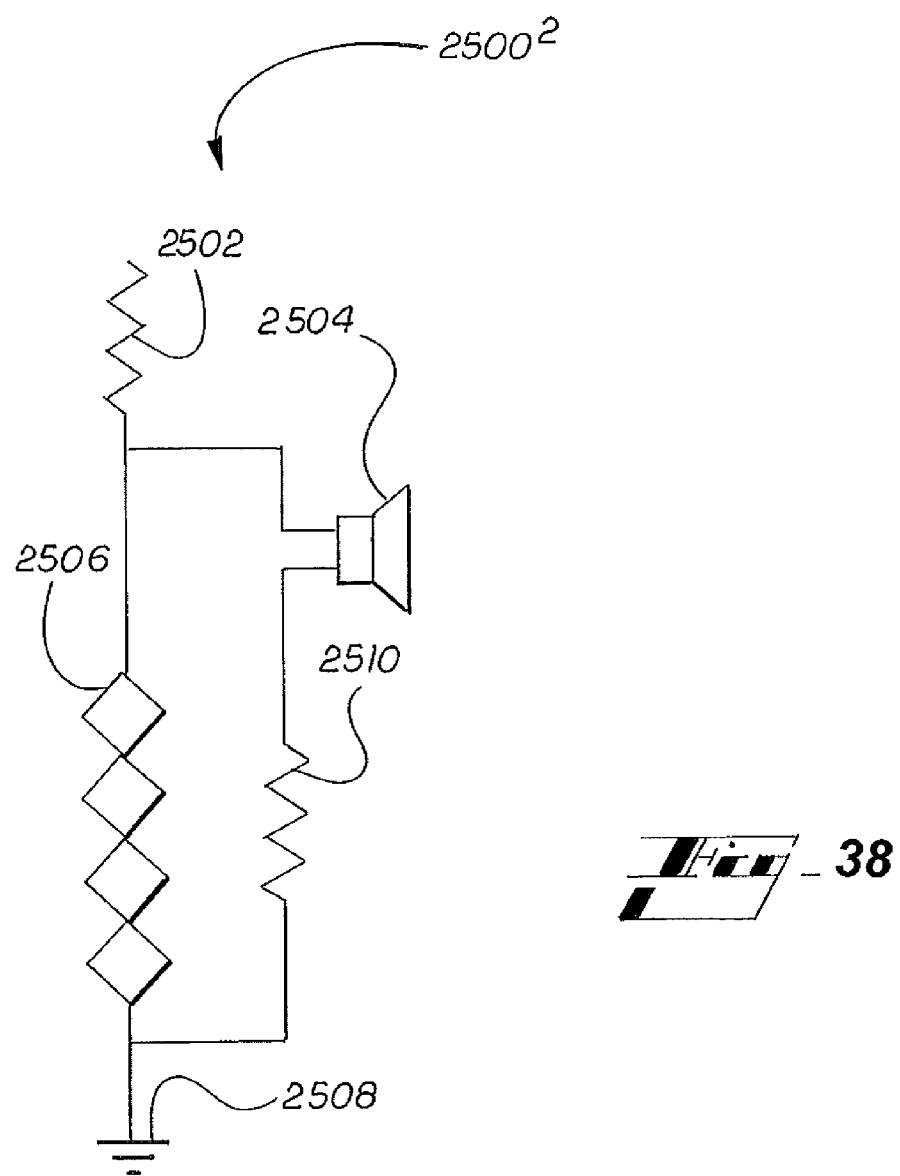
FIG. 38 shows a circuit, like that of FIG. 37, except with the audible indicator (and a second resistor) in parallel with the transformable material.

FIGS. 37 and 38—Notification-Device Arrangements

FIG. 37 shows a circuit $2500^1$ having an audible indicator 2504 and a resistor 2502 (R1) in series with a transformable material 2506 (e.g., SMA). The indicator can be like any of the audible devices (e.g., sound alarms) described herein. The circuit 2300 also includes or is connected to an electrical ground 2508.

Example load/power uses for this circuit are scaled and full power.

In some embodiments, a visible indicator (e.g., LED or other light-emitting device) is included in series along with, or instead of, the audible indicator.

In some embodiments, it is preferred to have at least an audible indicator, which in some cases is expected to be more noticeable by persons in the area of the system having the circuit $2500^1$ than LED warnings alone.

FIG. 38 shows a circuit $2500^2$ like that of FIG. 37, except the audible indicator 2504 is in parallel with the transformable material 2506. As also shown in FIG. 38, the circuit $2500^2$ includes a second resistor 2010 (R2) in series with the audible indicator.

As with FIG. 37, in some embodiments, the circuit $2500^2$ of FIG. 38 can include a visible indicator along with or instead of the audible indicator. And, again, in some embodiments, it is preferred to have at least an audible indicator, which in some cases is expected to be more noticeable by persons in the area of the system having the circuit $2500^2$ than just LED warnings.

Another Electrical Control Solution

Another strategy includes using an adapter for switching mode (a switching-mode adapter). Benefits of this strategy include that it can accommodate a variable input source, e.g., different voltages. Another benefit is that it changes input voltage down to a consistent, usable level.

Still another benefit of this approach is that it facilitates actuation over a range of voltages of the SMA, and so the latch (e.g., latch 1204) in embodiments having such a locking safety mechanism. In some cases, the arrangement is limited to a voltage range. In some cases, the arrangement can be expanded by custom-designing to accommodate voltages beyond such a range.

Other components may be used to perform the same functions.

Benefits and Addition Concepts

As provided, benefits of the present technology include protecting persons from electrical shock in one or more of a variety of ways.

Other benefits include providing the protections (1) using unwanted electricity, and so without use of, and so conservation of, other electricity, and (2) without the cost or other challenges (e.g., maintenance) related to complex devices such as a computer processing unit.

Another benefit is the systems being configured and arranged to perform their desired functions, not only automatically, but also until the need for performance is no longer needed. In this event, the biasing element causes the actuator to reset—e.g., stretch back to its temporary, unactuated, state.

Some embodiments of the present technology can be referred to as passive-actuation systems, being configured and arranged to passively actuate one or more safety mechanisms—e.g., locking mechanism, blocking mechanism, to hold an electrical connection closed thereby promoting drainage of unwanted electrical charge.

The passive aspect of such systems relates to an ability of the system to actuate the safety mechanism(s) automatically without being triggered or controlled by an electric current and/or signal from a complex computing or controlling device system. Instead, activation is triggered merely by an environmental or situational condition, such as an unwanted temperature (unwanted ambient temperature), an unwanted electrical current from residual charge in a component (e.g., power box), by unwanted radiation, or an electrical current from a secondary (e.g., control) signal to a component (e.g., power box). In the latter example, the electrical current is not formed and transferred to the present safety system for the purpose of operating the safety system, but rather the current is provided to devices distinct from the safety system (e.g., to a device such as a power box, and more particularly control aspects thereof, as compared perhaps to driving aspects thereof). In these regards, the corresponding systems can be referred to as being passive.

CONCLUSION

Various embodiments of the present disclosure are disclosed herein. The disclosed embodiments are merely examples that may be embodied in various and alternative forms, and combinations thereof.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed:

1. A system, for selectively actuating a safety mechanism, using a transformable material, to protect against an unwanted condition, comprising:
   a body;
   a first connection point connected mechanically to the body and including a first pulley device configured to accommodate one or more strands of the transformable material; and
   a second connection point connected mechanically to the safety mechanism, in operation of the system, and including a second pulley device configured to accommodate the one or more strands of transformable material;
   wherein the transformable material is arranged in mechanical connection to the safety mechanism by way of the second connection point so that change in the transformable material in operation of the system causes movement of the safety mechanism between a protecting position for the safety mechanism and a non-protecting position for the safety mechanism.

2. The system of claim 1, further comprising:
   a biasing element;
   the safety mechanism configured to, in operation of the system, be selectively moved, against force of the biasing element, by operation of the one or more strands of transformable material, to one of the protecting position and the non-protecting position; and
   the one or more strands of transformable material being configured and arranged in the system so that, in operation of the system, when the one or more strands of transformable material are exposed to a stimulus, the one or more strands change from a first form to a second form, thereby moving the safety mechanism between the protecting position and the non-protecting position.

3. The system of claim 2, wherein the stimulus is selected from a group consisting of electrical current, heat, lack of heat, and radiation.

4. The system of claim 1, wherein:
   the one or more strands comprise multiple strands; and
   each of the first pulley device and the second pulley device includes a plurality of grooves through which the multiple strands of transformable material pass when the system is assembled for use.

5. The system of claim 1, further comprising an overload-protection subsystem, for protecting the transformable material, comprising:
   an overload-protection arm connected to the first connection point and rotatably connected, at a pivot point, to the body; and
   an overload-protection biasing component connected to an end of the overload-protection arm to bias the arm to rotate in a first direction about the pivot point;
   wherein the one or more strands of transformable material are connected to the first connection point to, when actuated, move the connection point and thereby the overload-protection arm to rotate about the pivot point in a second direction opposite the first direction.

6. The system of claim 1, further comprising:
   an overload-protection biasing component; and
   an adjustment mechanism being connected to the overload-protection biasing component and configured to control a biasing force level of the biasing component.

7. The system of claim 5, wherein:
   the end of the overload-protection arm, to which the overload-protection biasing component is connected, is a first end of the overload-protection arm; and
   the system further comprises an overload stop connected to the body adjacent a second end of the overload-protection arm.

8. The system of claim 5, wherein:
   the pivot point includes an overload link; and
   the body includes a cavity configured to receive the overload link, allowing the link to rotate in the cavity and thereby the overload-protection arm to rotate about the pivot point.

9. The system of claim 5, further comprising a work arm, wherein the first pulley device extends between the work arm and the overload-protection arm.

10. The system of claim 1, further comprising an overload-protection subsystem, for protecting the transformable material, including:
    a hot cutoff switch being connected to the body and including a first trigger feature; and
    a second trigger feature connected to the second connection point and positioned to engage the first trigger feature in response to the second connection point being moved in a predetermined manner.

11. The system of claim 1, further comprising a manual-release sub-system being configured to allow a user to selectively de-activate the safety mechanism and comprising:
    a first mounting part connected to the body;
    a second mounting part positioned movably within a cavity of the body; and
    a biasing component extending between the first mounting part and the second mounting part.

12. The system of claim 1, wherein the transformable material is:
- connectable electrically, for operation of the system, to an electrical component having an unwanted electrical charge;
- changeable between a deformed shape and an undeformed shape based on electrical input resulting from the electrical charge at the electrical component; and
- configured and arranged in the system to, in response to being exposed to the electrical input, change to its undeformed shape and thereby actuate the safety mechanism to move between the protecting position and the non-protecting position.

13. The system of claim 12, wherein the safety mechanism includes an openable/closable electrical switch positioned between the transformable material and the electrical component.

14. The system of claim 13, wherein:
the body is a system body; and
the electrical switch is a blade-style contact switch including:
- a non-conductive switch body;
- a first electrical contact configured to connect to a main power source of the system;
- a second electrical contact configured to connect to the transformable material; and
- at least one conductive blade configured to be connected to the electrical component and arranged in the system to selectively engage the first electrical contact or the second electrical contact.

15. The system of claim 12, further comprising a draining sub-system configured and arranged in the system to reduce unwanted electrical charge in the electrical component.

16. The system of claim 15, wherein the draining sub-system comprises a circuit having an arrangement selected from a group consisting of:
(a) a resistor being linked in series with the transformable material;
(b) the resister, being a first resistor, connected to a sub-arrangement including the transformable material and a second resistor connected in parallel;
(c) the first resistor in series with a diode and the transformable material;
(d) the first resistor connected to a sub-arrangement including the diode and the transformable material connected in parallel;
(e) the first resistor connected to a sub-arrangement including the transformable material connected in parallel to a diode in series with the second resistor;
(f) a positive temperature coefficient switch in series with the transformable material;
(g) an electrical breaker in series with a transformable material and the first resistor;
(h) the first resistor in series with the transformable material, and further in series with an audible indicator and/or a visual indicator; and
(i) the first resistor connected to a sub-arrangement including the transformable material connected in parallel to the second resistor in series with an audible indicator and/or a visual indicator.

17. The system of claim 1, further comprising the safety mechanism, wherein:
the safety mechanism comprises a movable locking component; and
the transformable material is connected mechanically to the movable locking component safety mechanism so that, in operation of the system, change in the transformable material causes the locking component to move between an unactuated state, in which the locking component is disengaged from a receiving component, and an actuated state, in which the locking component engages the receiving component.

18. A system, for selectively actuating a safety mechanism, using a transformable material, to protect against an unwanted condition, comprising:
a body;
a first connection point connected to the body and configured to accommodate the transformable material;
a second connection point connected to the safety mechanism and configured to accommodate the transformable material; and
an overload-protection sub-system configured to protect the transformable material, the sub-system comprising:
- an overload-protection arm connected to the first connection point and rotatably connected, at a pivot point, to the body; and
- an overload-protection biasing component connected to an end of the overload-protection arm to bias the arm to rotate about the pivot point.

19. The system of claim 18, wherein:
the overload-protection biasing component, in being connected to the end of the overload-protection arm to bias the arm to rotate about the pivot point, is configured to bias the arm to rotate in a first direction about the pivot point; and
the transformable material is connected to the first connection point to, when actuated, move the connection point and thereby the overload-protection arm to rotate about the pivot point in a second direction opposite the first direction.

20. A system, for selectively actuating a safety mechanism, using a transformable material, to protect against an unwanted condition, comprising:
a body;
a first connection point connected to the body and configured to accommodate the transformable material;
a second connection point connected to the safety mechanism and configured to accommodate the transformable material; and
an overload-protection sub-system configured to protect the transformable material and comprising:
a hot cutoff switch being connected to the body and including a first trigger feature; and
a second trigger feature connected to the second connection point.

21. A system, for selectively actuating a safety mechanism, using a transformable material, to protect against an unwanted condition, comprising:
a first biasing element;
the safety mechanism comprising a movable locking component configured and arranged to, in operation of the system, be selectively moved, against force of the first biasing element, by operation of the transformable material between an unactuated state, in which the safety mechanism is de-activated by the locking component being disengaged from a receiving component and, and an actuated state, in which the safety mechanism is activated by the locking component engaging the receiving component; and a manual-release sub-system being configured to allow a user to selectively de-activate the safety mechanism and comprising:
  a first mounting part connected to the body;
  a second mounting part positioned movably within a cavity of the body; and
  a second biasing component extending between the first mounting part and the second mounting part.

22. The system of claim 21, wherein:
the safety mechanism is configured and arranged in the system so that, in operation of the system, when the transformable material moves the movable locking component against the force of the first biasing element in operation of the system, the movable locking component moves according to a first movement; and
the manual-release sub-system, in being configured to, in operation of the system, allow the user to selectively de-activate the safety mechanism in operation of the system, is configured to cause the movable locking component to move according to a second movement differing from the first movement.

23. The system of claim 22, wherein the manual-release sub-system is configured to, in operation of the system, in response to user input in operation of the system, de-activate the safety mechanism without moving the movable locking component with respect to the body.

* * * * *